(12) United States Patent
Carlucci et al.

(10) Patent No.: US 7,535,888 B1
(45) Date of Patent: May 19, 2009

(54) SYSTEM AND METHOD FOR PROVIDING IN-BAND TIMING INFORMATION TO DIGITAL HOME COMMUNICATION TERMINALS

(75) Inventors: John B. Carlucci, Boulder, CO (US); Ran Oz, Modiin (IL)

(73) Assignee: BigBand Networks, Inc., Redwood City, CA (US)

( * ) Notice: Subject to any disclaimer, the term of this patent is extended or adjusted under 35 U.S.C. 154(b) by 1433 days.

(21) Appl. No.: 10/209,349

(22) Filed: Jul. 30, 2002

Related U.S. Application Data

(63) Continuation of application No. 10/023,953, filed on Dec. 17, 2001, now abandoned, which is a continuation-in-part of application No. 09/579,551, filed on May 26, 2000, now Pat. No. 6,434,141.

(51) Int. Cl.
*H04L 12/66* (2006.01)
(52) U.S. Cl. ..................................... 370/352
(58) Field of Classification Search ................. 370/352, 370/422, 426, 419, 420, 427, 535, 486, 468, 370/538, 539, 540, 485; 709/227, 228
See application file for complete search history.

(56) References Cited

U.S. PATENT DOCUMENTS 5,661,528 A * 8/1997 Han ........................... 348/607
6,032,019 A * 2/2000 Chen et al. .................. 725/124
6,081,526 A * 6/2000 Saeijs et al. ................. 370/394
6,438,143 B1 * 8/2002 Higashida .................... 370/503
6,629,227 B1 * 9/2003 Jerding et al. ............... 711/170
7,158,185 B2 * 1/2007 Gastaldi .................. 348/435.1

* cited by examiner

*Primary Examiner*—Chi H Pham
*Assistant Examiner*—Alexander Boakye
(74) *Attorney, Agent, or Firm*—Pearl Cohen Zedek Latzer, LLP

(57) ABSTRACT

The invention provides a system and method for providing timing information packets to a plurality of digital home communication terminals. The timing information can be utilized for implementing media access schemes. The system includes a timing information packet generator, for generating timing information packets and providing timing information packets to a transmitter; and a transmitter, coupled to the timing packet generator, for transmitting timing information packets to at least a plurality of digital home communication terminals, in response to the at least one frequency. The method includes the steps of: tracking the at least one frequencies; generating timing information packets; and transmitting timing information packets to the digital home communication terminals in response to the at least one frequency. Conveniently, the step of tracking including receiving information transmitted from digital home communication terminals indicative of the at least one frequency.

50 Claims, 13 Drawing Sheets

SYSTEM AND METHOD FOR PROVIDING IN-BAND TIMING INFORMATION TO DIGITAL HOME COMMUNICATION TERMINALS

RELATED APPLICATIONS

This patent application is a Continuation of U.S. patent application Ser. No. 10/023,953, filed Dec. 17, 2001 now abandoned, which is a Continuation-In-Part of U.S. patent application Ser. No. 09/579,551, filed May 26, 2000 now U.S. Pat. No. 6,434,141.

This patent application incorporates by reference U.S. patent application Ser. No. 09/595,624 Filed Jun. 16, 2000.

FIELD OF THE INVENTION

The present invention relates to communication systems and methods in general, and to methods and systems for providing timing information to digital home communication terminals and especially for providing timing information to be used in media access control (MAC) schemes.

BACKGROUND OF THE INVENTION

Headends are coupled to multiple set-top boxes via in-band and out-of-band channels. Forward out-of-band channels convey (downstream) signals from headends to digital home communication terminals (DHCTs) while backward out-of-band channels convey (upstream) signals from digital home communication terminals to headends. Downstream signals usually include media signals, data signals, system messages and the like.

In-band channels are usually a part of communication networks such as hybrid fiber coax (HFC) networks. In-band channels are utilized for the transmission of digital broadcast programs and/or analog broadcast programs. The bandwidth of the out-of-band channels, and especially the reverse out-of-band channels is limited. This limited bandwidth is shared by many digital home communication terminals. Media access control (MAC) protocols are required for sharing a single upstream out-of-band channel between multiple digital home communication terminals.

General Instrument has developed an out-of-band format known as SCTE DVS 178. This format uses polling and ALOHA MAC schemes. In polling mode, a digital home communication terminal, such as a set top box, can transmit upstream data only when polled by the headend controller. ALOHA ALOHA is also known in the art as Carrier Sense Multiple Access with Collision Detect (CSMA/CD). CSMA/CD was first utilized in Ethernet networks. In order to transmit a packet over a shared communication channel a transmitter needs to sense that no packet is currently being transmitted. This scheme can cause collisions, as more than a single transmitter can sense a lack of activity and try simultaneously to transmit packets. The scheme detects collisions, aborts the colliding transmission and reschedule the transmission for a random time later. It is noted that in Ethernet networks carrier sense is used to detect whether no packet is currently transmitted while in cable systems a MAC controller transmits downstream system messages reflecting the status of the channel.

Scientific Atlanta adopted an out-of-band format known as SCTE DVS 167. This format has three modes: (i) a contention mode that uses slotted ALOHA, (ii) reservation mode in which a transmitter requests a guaranteed transmit opportunity and transmits only if the request defining allowable time slots for transmission is accepted, and (iii) Contentionless mode that guarantees a certain number of slots to a connection.

Slotted-ALOHA differs from ALOHA as the time line for transmission is divided into time slots. A transmission of data can be initialized at the beginning of a time slot, and not at any arbitrary time, as in ALOHA. A time slot allows for a transmission of a packet of a predefined length and also includes a guard period. Packets that are longer than the predefined length are segmented prior to the transmission and are reassembles after being received by a receiver.

The three modes of SCTE DVS 167 format require precise synchronization and scheduling between different transmitters. SCTE DVS 178 MAC does not include a transmission of timing information.

System messages such as conditional access entitlement information, system information, program-guide information, emergency alert system information can be delivered via forward out-of-band channels or by in-band channels.

The transmission and especially the reception and processing of forward out-of-band transmitted system messages is defined (and accordingly limited) by the out-of-band standards utilized in the system. For example, DVS 178 compatible systems are configured to receive and adequately process DVS 178 compatible system messages.

In-band transmission of system messages has some disadvantages. Michael Adams describes some of these disadvantages at "OpenCable Architecture", Cisco Press, 2000, pages 95-96. For example: each set top box has an in-band channel that can be tuned to a single channel out of multiple available channels. As the status of each set-top-box is not known to the headend, system messages must be simulcast at each possible channel. This simulcast is bandwidth consuming and requires message insertion equipment for every channel. Some of these channels are analog channels which have a very limited capacity to carry data.

A transmission of system messages, either in in-band or out-of-band channels has another further disadvantage. As the headend in not aware whether a system message was received by a digital home communication terminal the system messages are repeatedly transmitted. The system messages are transmitted in a circular queue that includes system messages to each digital home communication terminal that is coupled to the headend. As the amount of digital home communication terminals increases this causes considerable queuing delay.

There is a need to provide a system for enhancing the capabilities of DVS 178 compatible digital home communication terminals.

There is a need to provide timing information to digital home communication terminals in an efficient manner.

SUMMARY OF THE PRESENT INVENTION

The invention provides a system for providing timing information to a plurality of digital home communication terminals being tuned to at least one frequency, the system including: a timing information packet generator, for generating timing information packets and providing timing information packets to a transmitter; and a transmitter, coupled to the timing packet generator, for transmitting timing information packets to at least a plurality of digital home communication terminals, in response to the at least one frequency.

The invention provides a system and method wherein at least one digital home communication terminal is a timing information limited digital home communication terminals. Conveniently, a timing information limited digital home communication terminal is not able to receive or process timing information in at least one predefined manner. Preferably, it is not able to receive timing information being transmitted in lower communication layers. It can also be a DVS 178 compliant digital home communication terminal.

The invention provides a system and method for providing timing information wherein timing information can include media control access information, reference clock, system messages and the like. The media access control information can be utilized for media access control schemes such as but not limited to contentionless mode, reservation mode, slotted ALOHA and the like. For example, timing information and/or media access control information can include information indicative of an allocation of time slots to digital home communication terminal upstream transmissions, an acknowledgement to a request of a digital home communication terminal to transmit during a time slot and the like.

The invention provides a system and method wherein timing information packets are self-contained. Conveniently, the timing information packets are MPEG compliant and can be included within data elementary streams.

The invention provides a system and method wherein the system is operative to receive information transmitted from digital home communication terminals. The information can indicate the at least one frequency to which the digital home communication terminals are tuned.

The invention provides a system for controlling an access of a group of digital home communication terminals to a shared channel, the group of digital home media communication terminals being tuned to at least one frequency, the system including: a centralized media access controller for generating media access control information; and a transmitter, coupled to the centralized media access controller, for transmitting timing information packets embedding media access control information to the group of digital home communication terminals in response to the at least one frequency.

The invention provides a system for controlling an access of a group of digital home communication terminals to a shared channel, the system further includes a router, coupled between the centralized media access controller and the transmitter, the router operative to receive timing information packets and media packets, and to provide timing information packets and media packets to the group of digital home communication terminal; and a session manager, coupled to the router, the session manager providing routing instructions to said router, for dynamically selecting timing information packets and media packets out of the received timing information packets and media packets.

The invention provides a system in which each digital home communication terminal is configured to filter timing information packets that are directed either (a) to the digital home communication terminal, or (b) to at least one member of a group of digital home communication terminals that includes the digital home communication terminal.

The invention provides a system wherein the transmitter includes a plurality of network transmitters. Conveniently, the system further includes a network dynamic network restructuring unit, coupled to the network transmitters, for providing channel managing commands to each said network transmitters, receiving timing information packets from said router. Conveniently, the session manager receives a plurality of session requests, for executing a session through the system, the session manager either allows or denies each said session requests, said session manager provides resource allocation parameters for each said allowed sessions.

The invention provides a system for providing media packets and timing information packets to a plurality of digital home communication terminals being tuned to at least one frequency, wherein some of the timing information packets and some of the media packets are non-addressable packets, wherein some media packets are addressable packets, wherein the system including: a router, operative to receive timing information packets and media packets, and to provide timing information packets and media packets to the plurality of digital home communication terminals; and a session manager, coupled to the router, the session manager providing routing instructions to said router, for dynamically selecting timing information packets and media packets out of the received timing information packets and media packets. Conveniently, the system further includes a transmitter for transmitting timing information packets embedding media access control information to the group of digital home communication terminals in response to the at least one frequency.

Conveniently, the router includes: a plurality of input ports, including at least one non-addressable stream input port; a plurality of non-addressable stream output ports; a multiple port switch, connected between said non-addressable stream input ports and said non-addressable stream output ports; said multiple port switch directing a non-addressable timing information packets and media packets, received from a selected one of said at least one non-addressable stream input ports, to at least a selected one of said at least one non-addressable stream output ports, said multiple port switch selecting said selected non-addressable stream output port according to the type and identity of said selected non-addressable stream input port and the identity information embedded in said non-addressable timing information packet.

Conveniently, the system further includes at least one addressable stream communication port, connected to said multiple port switch, said multiple port switch directing an addressable media packet, received from a selected one of said at least one addressable stream communication ports, to at least a selected one of said at least one non-addressable stream output ports. Conveniently, the selected non-addressable stream output port encapsulates an addressable media packet in a non-addressable stream packet, when the addressable packet is received from one of said at least one addressable stream input ports. Preferably, MPEG transport packets are encapsulated into communication packets respective of the communication protocol of said multiple port switch.

Conveniently, said at least one non-addressable stream input port includes a multiple program transport interface and wherein said at least one non-addressable stream output port includes a multiple program transport interface.

Preferably, the system further including a plurality of stream processors, each said stream processor being connected between said multiple port switch and a respective one of said non-addressable stream output ports.

The invention provides a digital home communication terminal operative to share an upstream channel with other digital home communication terminals, the digital home communication terminal includes: a tuner, coupled to a communication channel, for receiving timing information packets and media packet; a filter, coupled to the tuner, for filtering received timing information packets and media packets, and providing the timing information packets to a processor; a processor, coupled to a display unit, configured to process the timing information packets and accordingly to control an access of the digital home communication terminal to the upstream channel. Conveniently, the filter includes an MPEG parser. Preferably, the digital home communication terminal is adapted to transmit, via the upstream channel, a status of the tuner to a system for providing timing information packets.

The invention provides a method for generating and providing timing information packets to digital home communication terminals, the digital home communication terminals tuned to at least one frequency, the method including the steps of: tracking the at least one frequency; generating timing information packets; and transmitting timing information packets to the digital home communication terminals in response to the at least one frequency. Conveniently, the step of tracking including receiving information transmitted from digital home communication terminals indicative of the at least one frequency.

The invention provides a method for controlling an access of a group of digital home communication terminals to a shared channel, the group of digital home media communication terminals being tuned to at least one frequency, the method including the steps of: generating media access control information and transmitting timing information packets embedding media access control information to the group of digital home communication terminals in response to the at least one frequency.

The invention provides a method for providing timing information to a plurality of digital home media communication terminals being tuned to at least one frequency, the method including the steps of: receiving timing information packets and media packets; dynamically selecting timing information packets and media packets out of the received timing information packets and media packets; and providing the dynamically selected timing information packets and media packets to the at least one group of digital home communication terminal.

The invention provides a method wherein at least some of the media packets and the timing information packets are non-addressable packets; and wherein the method further including the steps of: receiving non-addressable packets from an input port selected from at least one non-addressable stream input port; dynamically selecting packets out of the received packets to be provided to at least one of a plurality of non-addressable stream output ports; whereas at least one non-addressable stream output port is coupled to at least one group of end-users; and directing said non-addressable packets to said selected non-addressable stream output port. Conveniently, the selection is responsive to the type and identity of said selected input port and the identity information embedded in said received packet. Said input port is further selected from at least one addressable stream input port. Conveniently, the method further includes the step of encapsulating said packet in a non-addressable stream packet, when said packet is received from one of said at least one addressable stream input ports. Conveniently, the method further includes the step of encapsulating said packet in a addressable stream packet, when said packet is received from one of said at least one non-addressable stream input ports.

Preferably, the step of selecting including selecting session requests, for executing a session in which application packets are to be provided to an associated group of end-users. The step of selecting is preceded by a step of allocating system resources for providing the application packets.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

Figure 1A:
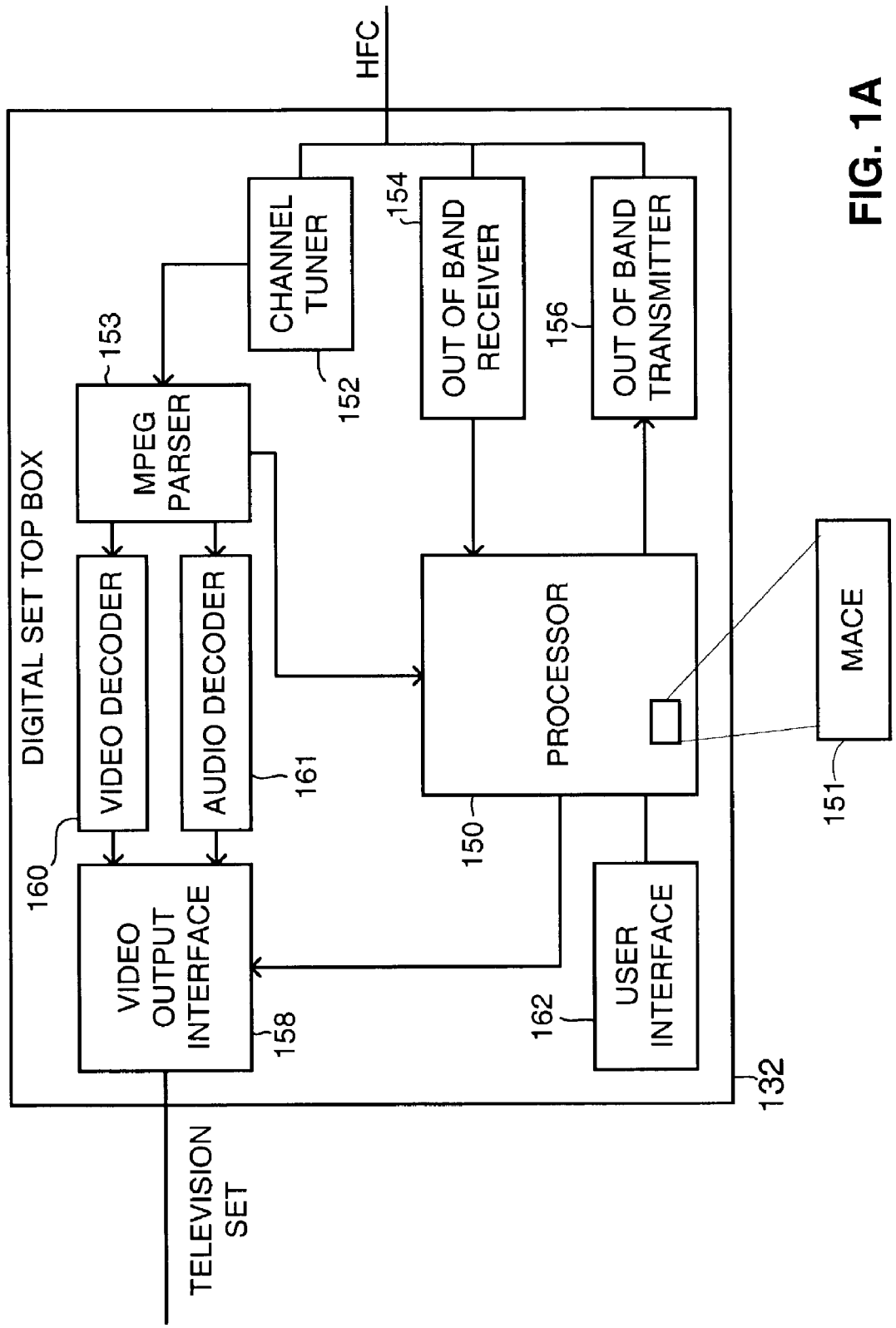
FIGS. 1A and 1B are illustrations of digital home communication terminals, operative in accordance with preferred embodiments of the present invention.

The disclosed technique is directed to a broadband network, which can be either wired or wireless, such as an HFC network, satellite communication and the like. The examples set forth interfaces an HFC network and hence includes specific cable related modules. For example, a network transmitter in the context of an HFC would be a QAM unit. These specific modules have to be replaced with equivalent modules, when operating on other types of broadband networks.

The following are definitions, which are used throughout the description of the disclosed technique:

DVB-ASI and DHEI are examples for digital video (MPEG) transmission specifications. The disclosed technique provides examples, which include DVB-ASI modules. It is noted that these DVB-ASI modules, can be replaced by equivalent modules, such as DHEI modules, and the like. MPEG denotes a family of media (especially video and audio) decoding and multiplexing specifications where ISO/IEC 11172 is also called and the ISO/IEC 13818 is also called MPEG-2.

Timing information can either be generated by a Broadband Multimedia System (BMS) or generated by an external timing generation device to be provided to the BMS. BMS encapsulates the timing information in timing information packets and provides the timing information packets and media packets to a plurality of digital home communication terminals, such as digital home communication terminals, connected to the BMS.

BMS is also configured to transmit system messages such as conditional access entitlement information, system information, program-guide information, emergency alert system information via forward out-of-band channels or by in-band channels. It is assumed that the BMS transmits system information using in-band channels and that the system messages are embedded within timing information packets.

According to an aspect of the invention BMS tracks the status of the digital home communication terminals (DHCTs) and especially the channels to which the DHCTs are tuned and in response transmits timing information packets in frequencies corresponding to these frequencies, thus allowing better bandwidth utilization. It is noted that some DHCTs, like single tuner DHCTs can be tuned to a single frequency at each given moment while some DHCT's can be tuned to more than a single frequency at the same time.

According to another aspect of the invention the BMS further comprises a transmission analyzer, such as dynamic network reconstructing unit or shared area managers, for analyzing the transmissions to DHCTs and determining the transmission characteristics of the timing information packet.

It is noted that the generation and the transmission of timing information packets can be done by other combination of software and hardware. For example, timing information packets can be multiplexed with media packets by a various statistical multiplexers, such as prior art statistical multiplexers. An RF transmitter can transmit the timing information packets in frequencies that are either predefined, or generated in response to the spectrum of multiplexed signals that are provided, over a broadband network such as a HFC network, to end-users. Conveniently, the BMS has a generator for generating timing information packets. The generator includes a MAC entity for generating the timing information embedded within the timing information packets.

For convenience of explanation it is assumed that both digital services and analog services, such as digital television and analog television channels can be switched across the same local paths of each BMS. It is noted that for the purpose of the invention analog and digital services can be conveyed over distinct paths. For example, while digital service signals are down converted and passed across a packet switching router, analog service signals can remain in a high frequency form, such as RF form, to be later combined with up-converted digital service signal that are outputted the router.

The scope of the invention is not limited to single tuner digital home communication terminals, and can be applied to digital home communication terminals that have more than a single tuner. For convenience of explanation only, FIG. 1 and the following figures refer to a single tuner digital home communication terminal.

Reference is further made to FIG. 1A, which is a schematic illustration of a single tuner digital home communication terminal, generally referenced DHCT 132. DHCT 132 is a timing information limited digital home communication center as it is not able to receive or process timing information in at least one predefined manner. A timing information limited digital home communication terminal can be a digital home communication terminal that is not able to process timing information being transmitted in a low communication layer. The disability can result from software, hardware limitations, from configurations and can be either temporary or permanently. A timing information limited digital communication terminal can also be a DVS 178 compatible digital home communication terminal.

Referring to FIG. 1A illustrative of DHCT 132, in accordance to a preferred embodiment of the invention. DHCT includes a channel tuner 152, an MPEG parser 153, an Out-Of-Band receiver 154, an Out-Of-Band transmitter 156, a user interface 162, a processor 150, a video decoder 160, audio decoder 161, a storage unit (not shown) and a video output interface 158. MPEG parser 153, Out-Of-Band receiver 154, Out-Of-Band transmitter 156, user interface 162, video output interface 158 and the storage unit, are connected to processor 150. Video decoder 160 and audio decoder 161 are connected to MPEG parser 153 and to video output interface 158. Channel tuner 152, Out-Of-Band receiver 154 and Out-Of-Band transmitter 156 are further connected to the HFC. Channel tuner 152 is further connected to MPEG parser 153. Video output interface 158 is further connected to multimedia output unit such as a television set and may further be connected to an audio system (not shown).

DHCT 132 receives elementary video, audio and data streams on MPEG transport in In-Band channels, via channel tuner 152. Channel tuner 152 tunes into the selected In-Band channel and provides the signal thereof to MPEG parser 153. MPEG parser 153 distributes the elementary streams received in the channel between processor 150, video decoder 160 and audio decoder 161. It is noted that MPEG parser 153 distributes only elementary streams, which belong to a specific program number. MPEG parser 153 provides timing information packets to processor 150.

Timing information packets have a unique PID identifier. According to an embodiment of the invention DHCT 132 150 filters timing information packets that are destined to DHCT 132 or to a group of digital home communication terminals that include DHCT 132. The filtering process can be responsive to a unique address, such as an IP address or an Ethernet address assigned to DHCT 132 or to a group of set-top boxes, such as a group of digital home communication terminals that share the same out-of-band upstream channel. It is noted that even if the same address is assigned to a digital home communication terminal group, MAC schemes require that each digital home communication terminal has its own ID, for allowing the scheduling of transmission from each digital home communication terminal.

It is assumed, for convenience of explanation only, that each digital home communication terminal has a unique address. The address is usually assigned to each digital home communication terminal group during an initialization step of DHCT 132 and broadband multimedia router 36 or 37. The unique address is conveniently embedded within MPEG transport stream payloads.

Video decoder 160 decodes the video elementary stream provided thereto and produces video output, to be provided to a television set via video output interface 158. Audio decoder 161 decodes the audio elementary stream provided thereto and produces audio output, to be provided either to a television set or to an audio system, via video output interface 158.

DHCT 132 and especially processor 150 are controlled by an operating system and at least one lower level software code. One of the lower level software code, allows for processing timing information embedded within timing information packets. The timing information can be utilized for various purposes, such as but not limited to MAC schemes. For convenience of explanation the software and/or hardware entity that processes the timing information packets and implements a media access control scheme is referred to as Media Access Control Entity (MACE) 151.

Figure 1B:
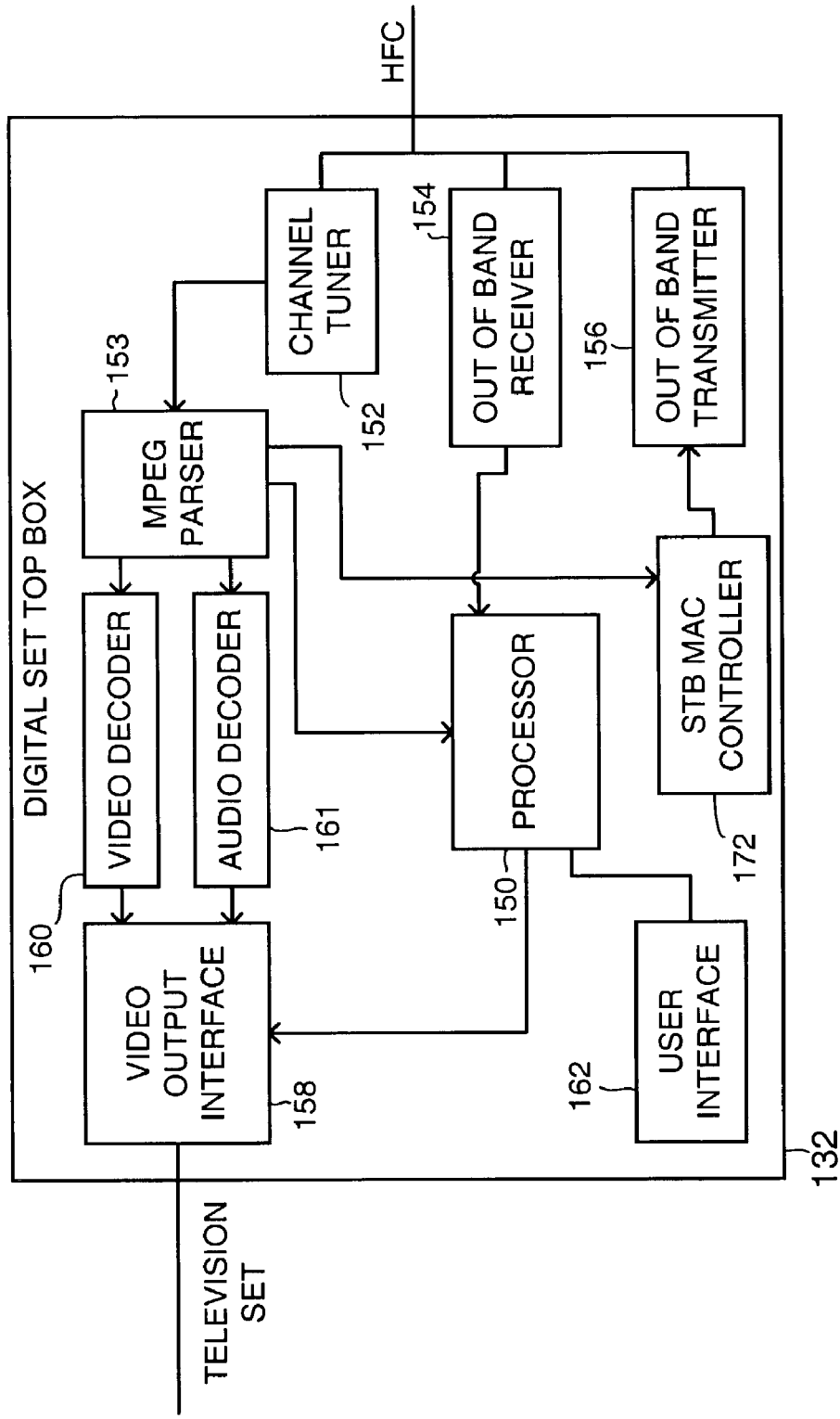

Referring to FIG. 1B, MPEG parser 153 and Out-Of-Band transmitter 156 are further connected to MAC hardware component 171. MAC hardware component 171 receives timing information from MPEG parser 153, processes the timing information and controls out-of-band transmissions.

According to an aspect of the invention, timing information is embedded in MPEG transport packets, referred to as timing information packets. All timing information packets include a unique PID that identifies them as being timing information packets. Each timing information packet includes designation information, such as DHCT 132 address (ADD) that differentiates it from other timing information packets destined to other digital home communication terminals. Timing information packets are received at channel tuner 152 and forwarded to MPEG parser 153. MPEG parser 153 identifies the unique PID and sends the received timing information packet to processor 150, either directly of via a storage unit. MACE 151 recognizes that timing information packet were provided to processor 150, filters the timing information packets in view of the ADD embedded within, so that it ignores timing information that is not destined to either DHCT 132 or to a DHCT group that share the same out of band upstream channel like DHCT 132. The timing information is processed and a variety of application can be executed, such as a MAC scheme for controlling the upstream out-of-band transmission from DHCT 132.

Figure 9:
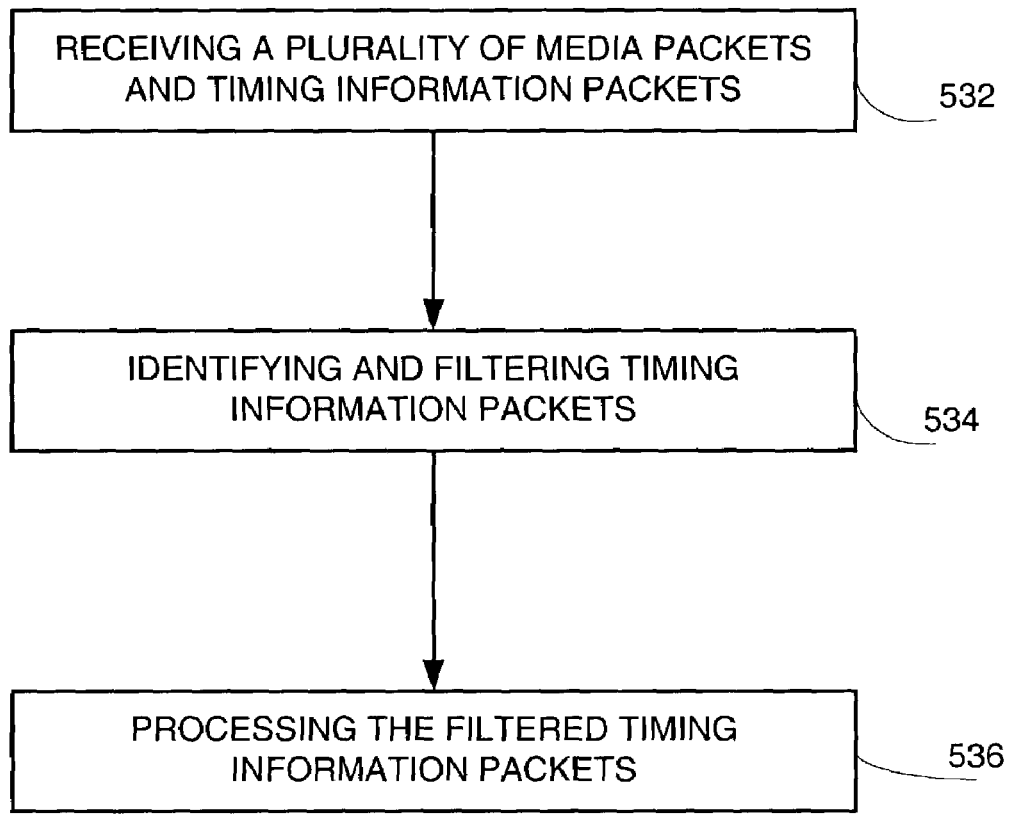
FIG. 9 illustrates a timing information packet, in accordance with a preferred embodiment of the invention.

Referring to FIG. 9, illustrating timing information packet 500, according to a preferred embodiment of the invention. Timing information packet 500 has an MPEG transport header $500_1$, the header includes a PID field $500_2$. The value of the PID filed indicates that the MPEG transport packet is a timing information packet. Timing information packet 500 further includes a unique ADD field $500_3$, and payload $500_6$.

It is noted that payload $500_6$ can include timing information and/or system messages. For example, the timing information can include a common MAC clock reference. The provision of a common MAC clock can be utilized for various purposes, such as but not limited to various MAC schemes.

According to another aspect of the invention a predefined sequence of signals representative of a start of a timeslot is transmitted periodically, the sequence is detected by the digital home communication terminal and is used to align the transmission of upstream out-of-band information. Usually the sequence of signals is embedded within a timing information packet header, thus preventing payload processing or errors resulting from an existence of such a sequence within the payload.

Digital home communication terminals are located in various locations, thus causing variations in upstream, downstream and round trip propagation period. Various methods are known in the art for overcoming these variations. For example, connecting to a single out-of-band upstream channel only digital home communication terminals that are located within a geographically limited vicinity and providing a guard time within each time slot.

System messages can include various messages, for supporting various MAC schemes. For example, in a slotted ALOHA mode, the system messages can include messages reflecting the status of an out-of-band upstream channel. In a reservation mode, a digital home communication terminal may transmit a request to transmit during time slots an out-of-band upstream message and the system messages can include acknowledgement or approval messages. In a contentionless mode the system messages can include an allocation of time slots for a transmission of upstream out-of-band signals from various digital home communication terminals. Table 1 illustrates an exemplary content of some system messages relating to a digital home communication terminal group that includes digital home communication terminals $34_{1,1}$-$34_{1,9}$.

| time slot | Scheduled transmitting digital home communication terminal |
|---|---|
| 1 | $34_{1,1}$ |
| 2 | $34_{1,1}$ |
| 3 | $34_{1,5}$ |
| 4 | $34_{1,9}$ |
| 5 | $34_{1,2}$ |
| 6 | $34_{1,5}$ |
| 7 | $34_{1,2}$ |
| 8 | $34_{1,3}$ |
| 9 | $34_{1,4}$ |
| 10 | $34_{1,5}$ |
| 11 | $34_{1,1}$ |
| 12 | $34_{1,3}$ |
| 13 | $34_{1,2}$ |
| 14 | $34_{1,5}$ |

A transmission of upstream data can result from various events, such as user initiated events. User interface 162 receives information, such as commands, requests, data and the like from an end-user and provides it to processor 150. Processor 150 analyzes that information and may transmit data in the upstream direction using Out-Of-Band transmitter 156. The transmission is scheduled in accordance to MAC schemes, such as but not limited to slotted ALOHA.

DHCT 132 can receive narrow cast data that is submitted In-Band, as illustrated at U.S. patent application Ser. No. 09/595,624 filed at Jun. 16, 2000 of Oz et al, which is incorporated in its entirety by reference.

Figure 2A:
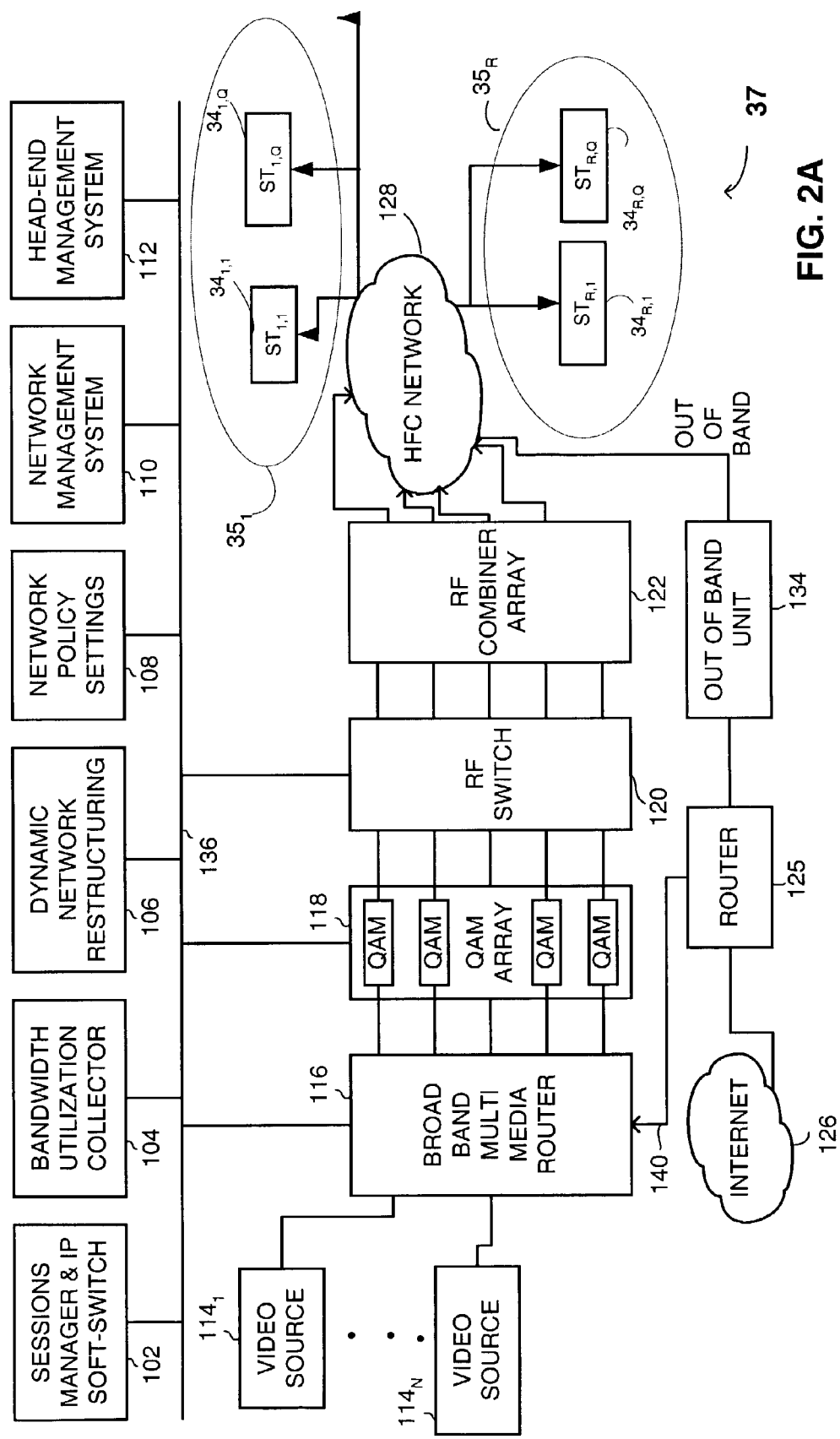
FIGS. 2A and 2B are schematic illustrations of a Broadband Multimedia System, constructed and operative in accordance with preferred embodiments of the present invention.
Figure 2B:
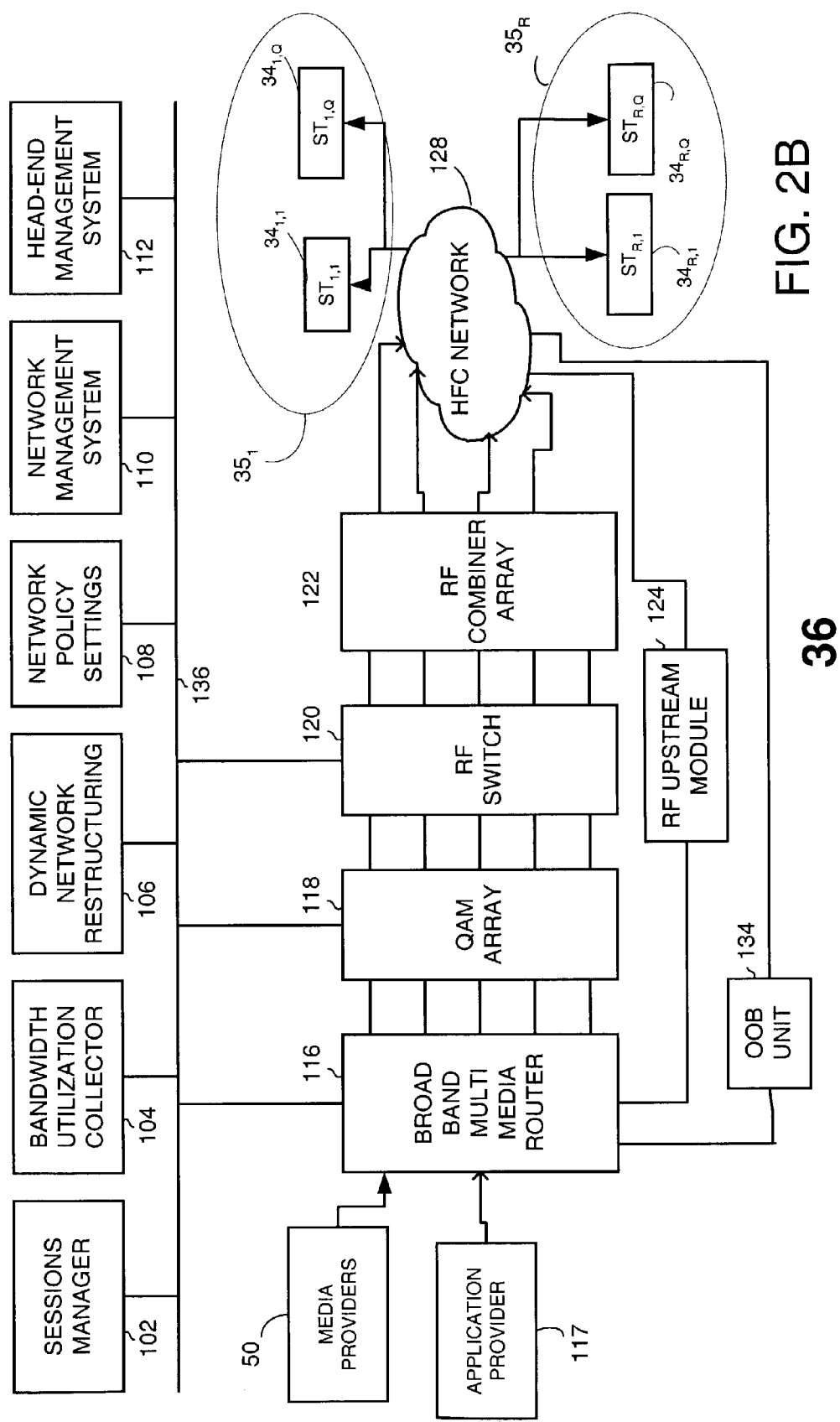

Reference is now made to FIGS. 2A and 2B, which are schematic illustrations of BMS 37 and 36, accordingly, constructed and operative in accordance with preferred embodiments of the present invention.

BMS 37 of FIG. 2A is analogues to BMS 36 of FIG. 2B but has an additional router 125, it is further coupled to Internet 126. Router 125 is coupled via link 140 to broadband multimedia router 166 for allowing digital home communication terminals to interact with Internet 126.

BMS 36 includes a logical communication bus 136, a session manager unit 102, a bandwidth utilization collector 104, a dynamic network restructuring unit 106, a network policy settings unit 108, a network management system 110, a broadband multimedia router 116, a QAM array 118, an RF switch 120, an RF upstream module 124, an RF combiner array 122, an Out-Of-Band unit 134, and a management system 112. BMS 36 is coupled to a plurality of digital home communication terminals $34_{1,1}$-$34_{R,Q}$ via Hybrid Fiber Coax (HFC) network 128. The digital home communication terminals are usually grouped in digital home communication terminal groups $35_1$-$35_Q$, whereas members of the same group usually receive the same in-band signal and share the same out of band upstream channel. Digital home communication terminal $34_{r,q}$ is the q'th member of the r'th group.

Broadband multimedia router 116 is coupled to logical communication bus 136, RF upstream module 124, QAM array 118, to at least one application provider, such as application server 115, to media providers such as VOD servers 252, music on demand unit 254, interactive MPEG unit 256, Internet television 258, telephony gateway 262, and the like.

Session manager unit 102, bandwidth utilization collector 104, dynamic network restructuring unit 106, network policy settings unit 108, network management system 110, and management system 112 are further connected to the logical communication bus 136.

RF switch 120 is connected to logical communication bus 136, QAM array 118 and to RF combiner array 122. RF upstream module 124 is connected to broadband multimedia router 116, and to the plurality of digital home communication terminals via the HFC network. RF combiner array 122 is further connected to Out-Of-Band unit 134 and to a plurality of digital home communication terminals.

Session manager unit 102 receives and approves session requests, processes them and provides routing parameters to the broadband multimedia router 116. During at least some of the sessions, multiple timing information packets are transmitted to a plurality of digital home communication terminals. According to an aspect of the invention each DHCT group receives a plurality of timing information packets at frequencies to which the DHCTs are tuned. Tracking the frequencies to which the DHCTs are tuned can be made in various manners, such as but not to limited to a transmission of tuner status information indicative of the frequency via Out-Of-Band unit (OOB) 134. BMS 36 receives the tuner status information and in response updates a service group database indicative of these frequencies.

Broadband multimedia router 116 receives media streams from video sources $114_1$-$114_N$ of FIGS. 2A and 2B. The media streams can include video streams, audio streams, data streams, individual data packets and the like. Such streams can be received over video channels, such as ones operative according to MPEG transport interfaces, or over data channels, such as TCP/IP Ethernet communication lines. Some of said media sources can be Video On Demand (VOD) server 252, music on demand server 254, interactive MPEG 256, Internet television 258, Internet access 260 and local telephony gateway 262 of FIG. 7.

According to an aspect of the invention, BMS 36 is able to transmit timing information packets to DHCTs that are tuned to a certain channel/frequency by tracking the resources that are allocated for the transmission of that channel and allocating compatible resources for the transmission of the timing information. For example, assuming that a digital home communication terminal has a single 6-Mhz wide tuner. If the specific channel is transmitted within a known window of 6-Mhz, then the timing information has to be carried by a carrier signal within the known window.

In order to receive a timing information packet, DHCT 132 has to be tuned to a frequency that includes the carrier frequency of the timing information packet. Digital home communication terminals having more than a single tuner can be configured to receive the timing information packet and additional data on a predefined frequency. The predefined channel does not necessarily relate to the frequency of a received program. In such a case timing information packet can be carried over carrier waves having that predefined frequency. Digital home communication terminals that have a single tuner have to receive the relevant applications packet with their single tuner.

BMS 36 is able to adjust a frequency of timing information packets that are intended to be received by a digital home communication terminal. The adjustment can require changing the resources allocation of BMS 36. According to an aspect of the invention timing information packets are transmitted at various frequencies, some corresponding to frequencies to which DHCTs are tuned and additional auxiliary frequencies. If a digital home communication terminal is tuned to a channel that is transmitted over one of the auxiliary frequencies, there is no need to change the resource allocation of BMS 36.

A reallocation of BMS's 36 resources can be handled by session manager 102, dynamic network reconstructing 106 and other units within BMS 36. Tracking the channels to which DHCTs are tuned allows for decreasing the resources (carrier frequencies) required to allow the provision and reception of timing information packets by digital home communication terminals.

The routing parameters produced by session manager 102, specify input and output routing commands for broadband multimedia router 116, to operate according. It is noted that a conventional MPEG transport stream does not include routing information such as destination or origin, rather just limited identification information, known as PID (Packet Identification) The disclosed technique overcomes this disadvantage as will be described in detail in conjunction with FIG. 7. Broadband multimedia router 116 forwards packets from a selected input port to a specified output port, according to either routing information embedded in the routed packet, or according to the routing parameters, associated with that routed packet.

According to the disclosed technique, each session entering the system has to be approved, and hence can also be denied. Session manager unit 102 receives session initialization requests from a variety of media sources, end-users and additional modules. Session manager unit 102, determines if these requests are compatible with each of a plurality of policy types and available resources, and determines whether or not to approve or deny these requests. According to a preferred embodiment of the invention, one type of session request indicates that a member of a service group requests to view a television channel.

Session manager unit 102 uses bandwidth parameters stored in bandwidth utilization collector 104, regarding the current bandwidth utilization. The session manager 102 accesses network policy settings unit 108, to determine if a selected initialization request conforms to various network policies. A network policy can virtually include any condition, which applies to the content, type, source, destination, network, and the like, which are included in the session initialization request. For example, selected types of sessions are denied for a selected node, when the bandwidth usage at that node, exceeds a predetermined value. In another example, a network policy can include a condition, which does not allow X-rated movies to be transmitted to selected end-users, at predetermined hours of the day. A further example for a network policy can include a condition where a selected source can only provide services to selected users, and not to others, and the like. The session manager further accesses network management system 110, for determining if there are malfunctions in selected parts of the network. According to a preferred embodiment of the invention, a network policy defines a group of digital and analog television channels that can potentially be provided to the members of the s'th set of service groups coupled to BMS 36. The content of the group can be dynamically configured, in view of the behavior patterns, and/or requests of the members.

QAM array 118 includes a plurality of QAM units (not shown), each receiving DVB-ASI media information and transmitting it modulated over an RF channel, connected thereto.

RF combiner array 122 includes a plurality of RF combiners (not shown), each operative to receive a plurality of RF channels and produce a single, multi-band RF signal, therefrom. The amount of QAM units usually is much larger than the amount of RF combiners. The RF switch 120 is operative to route RF channels from each port therein, to each other port therein. Hence, RF switch 120 can connect each QAM of QAM array 118 to each RF combiner of RF combiner array 122, and thus, dynamically control network RF resources. Dynamic network restructuring unit 106 controls each of the QAMs, thereby determining which frequencies that QAM shall modulate to. Dynamic Network Restructuring unit 106 further controls RF switch 120, such that the signals received from each of the QAMs are directed to a selected one of the RF combiners. Hence, Dynamic Network Restructuring unit 106 provides dynamic restructuring of the RF portion of the network. Each of the RF combiners receives channels in frequencies that have been transmitted from the QAM through RF switch, and combines them on a single line connected to members of a service group via HFC network communication link. This direction is called downstream.

RF upstream module 124 receives signals from the end-user equipment, and performs down-conversion and demodulation thereof. RF upstream module 124 can further include an RF switching mechanism, which optimizes the usage of the upstream direction, and hence can further enhance the operation of BMS 36. OOB 134 communicates with each of the targets of that upstream information in the Head-end, thus providing a reverse channel from HFC network 128 to Head-end. The communication is controlled by media access control entities such as MACE 151 and OOB 134.

Conveniently, BMS 36 has a generator for generating timing information packets. Preferably, the generator is logically located within OOB 134. OOB 134 includes a centralized MAC controller 135 for implementing MAC schemes on each upstream out of band channel. It is noted that a MAC controller can be assigned to each upstream out of band channel. Centralized MAC controller 135 can (a) either generate timing information or receive preliminary timing information and produce timing information, (b) provide the timing information to router 116, (c) generate system messages and provide the system messages to router 116. Preliminary timing information can include a centralized timing reference. System messages can include messages reflecting the status of the up-stream out-of-band channels. Centralized MAC controller 135 also is configured to embed timing information within timing information packets, by attaching a header such as the header illustrated in FIG. 9. It is noted that timing information packets can be MPEG compliant, and the timing information can be embedded in MPEG compliant packets. Accordingly, centralized MAC controller 135 is configured to generate these types of timing information packets.

OOB 134 receives status messages from digital home communication terminals and sends session manager 102, via router 116 resource allocation requests in response to the current resources that are being utilized for transmitting timing information and system messages.

Figure 3:
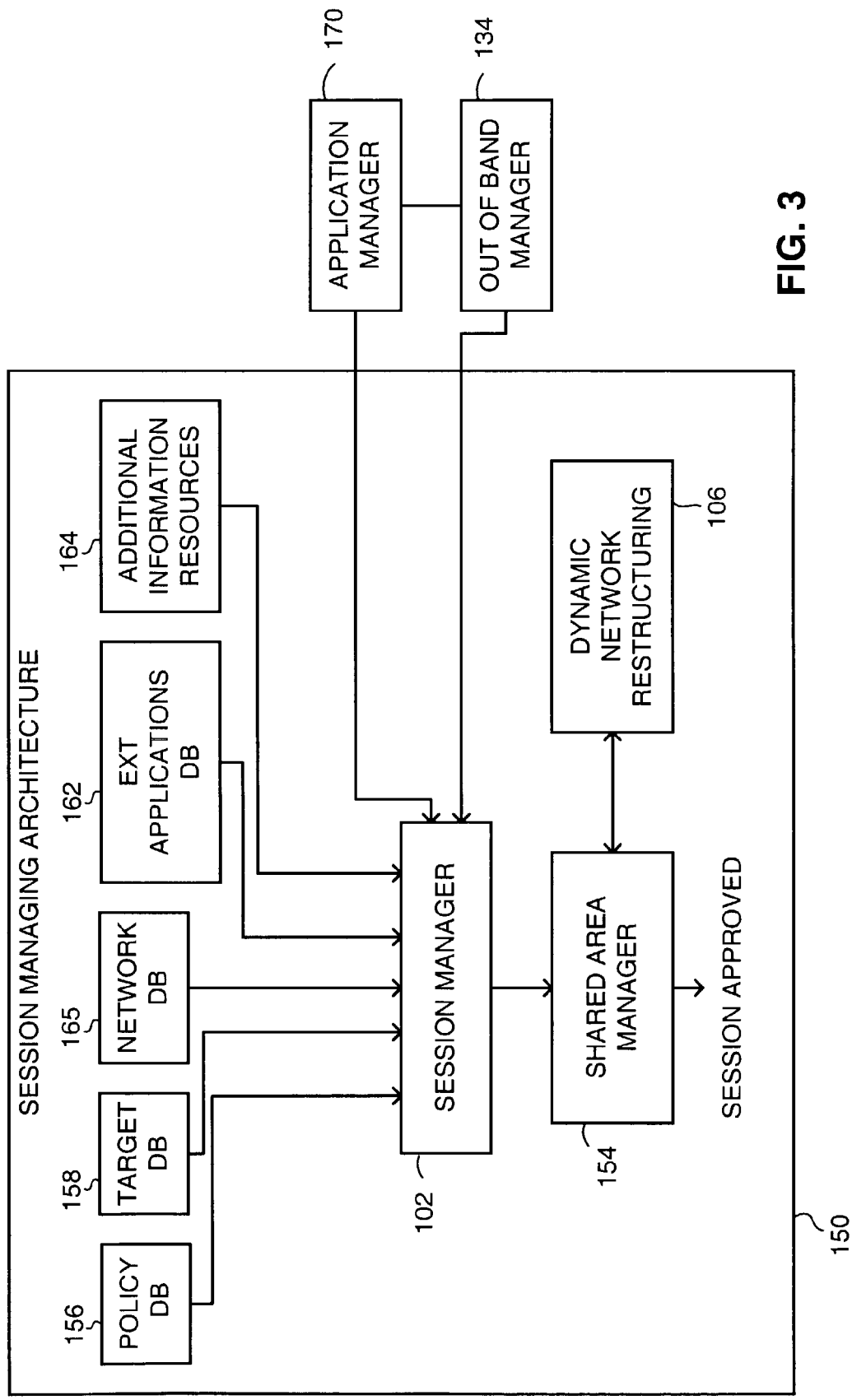
FIG. 3 is a detailed schematic illustration of a session managing architecture, constructed and operative in accordance with another preferred embodiments of the present invention.

Reference is now made to FIG. 3, which is a detailed schematic illustration of session managing architecture 140, constructed and operative in accordance with another preferred embodiment of the present invention. Session managing architecture 140 is described in conjunction with BMS 36 of FIG. 2.

Architecture 140 includes session manager 102, R shared area managers $144_r$, r ranges between 1 to R, a policy database 141, a target database 143, a network database 145, an external applications database 157, and an additional information resources 148. Architecture 140 further includes a Dynamic Network Restructuring Manager (DNR) 106, an application manager 170, and an Out-Of-Band manager 134.

A shared area usually includes a plurality of digital home communication terminals that share the same upstream out-of-band channel.

Policy database 141 is a general policy database which includes a plurality of policy records specifying rules, such as what kind of information can be transmitted in the system, from which sources, to which targets, at what time, and the like.

Target database 143 includes a plurality of target records. A target record can include information related to policies related to the target, network topological location of the target, and the like.

Network database 145 includes a plurality of network policy records. A network policy can include restrictions regarding overall usage of the network, such as a predetermined minimal transmission quality level for selected portions of the network, scheduling schemes for allocating selected portions of the network for specific services, and the like.

External applications database 157 includes a plurality of external application records specifying data on these applications, such as what is allowed or forbidden for these applications, and how are these applications connected to the system.

Each shared area manager $144_r$ manages the bandwidth utilization for the members of the r'th service group, using end point equipment, such as various cable units, digital television sets, and the like. It assigns the optimal channel to the session. According to a preferred embodiment of the invention each shared area manager monitors services, such as television channels and the like that are provided to the members of associated service group and can determine whether a requested service is already provided to the member, and whether the requested service can be provided to a member of the service group.

Architecture 140 can be configured to track the viewing patterns of the corresponding service group members and accordingly to determine which timing information packet to transmit, the RF channels that are used to convey timing information packet and the like.

Session manager 102 is connected to a plurality of shared area managers $144_1$-$144_r$, policy database 141, target database 143, network database 145, external applications database 157, additional information resources 148, application manager 170, and Out-Of-Band manager 134. Application manager 170 is further connected to Out-Of-Band manager 134. Shared area manager 144 is further connected to DNR manager 106.

As stated above, session manager 102 is operative to approve or deny session initialization requests to BMS 36. Session manager 102 receives an init-session request either from the application manager 170, or from the Out-Of-Band manager 134.

A session request, for providing display and control code can be generated by application server 117, but can also be generated in response to a transmission of media streams to a plurality of digital home communication terminals. In accordance with another aspect of the invention a session can be initiated by a digital home communication terminal, via Out-Of-Band manager 134, such as a first digital home communication terminal that started to be tuned to a specific channel.

Session manager 102 determines if the requested session can be approved according to a plurality of parameters such as network policies, target policies, general policies, application manager policies, additional information resources, and the like. It is noted that at this stage the session is not approved yet. The session manager accesses other modules such as the shared area manager 144 and the like, receives their "approval" and only then, approves the session and provides an initiation command to application server 180.

After the session manager 102 approves the session, it accesses the shared area manager 144, which attempts to allocate a suitable channel therefore. If the shared area manager 144 fails to allocate such a channel, then the session manager proceeds to the DNR manager 106. Otherwise, the session manager 102 approves the session.

The DNR manager 106 performs channel and frequency switching (in hardware), and dynamically changes the amount of channels, which are dedicated to each group of nodes, according to the bandwidth usage across groups of nodes. This allocation can be dynamic as long as the total number of dedicated channels does not exceed the maximum frequency band that is physically achievable within any specific group of nodes. If allocation fails, then the session manager 102 denies the session.

Figure 4:
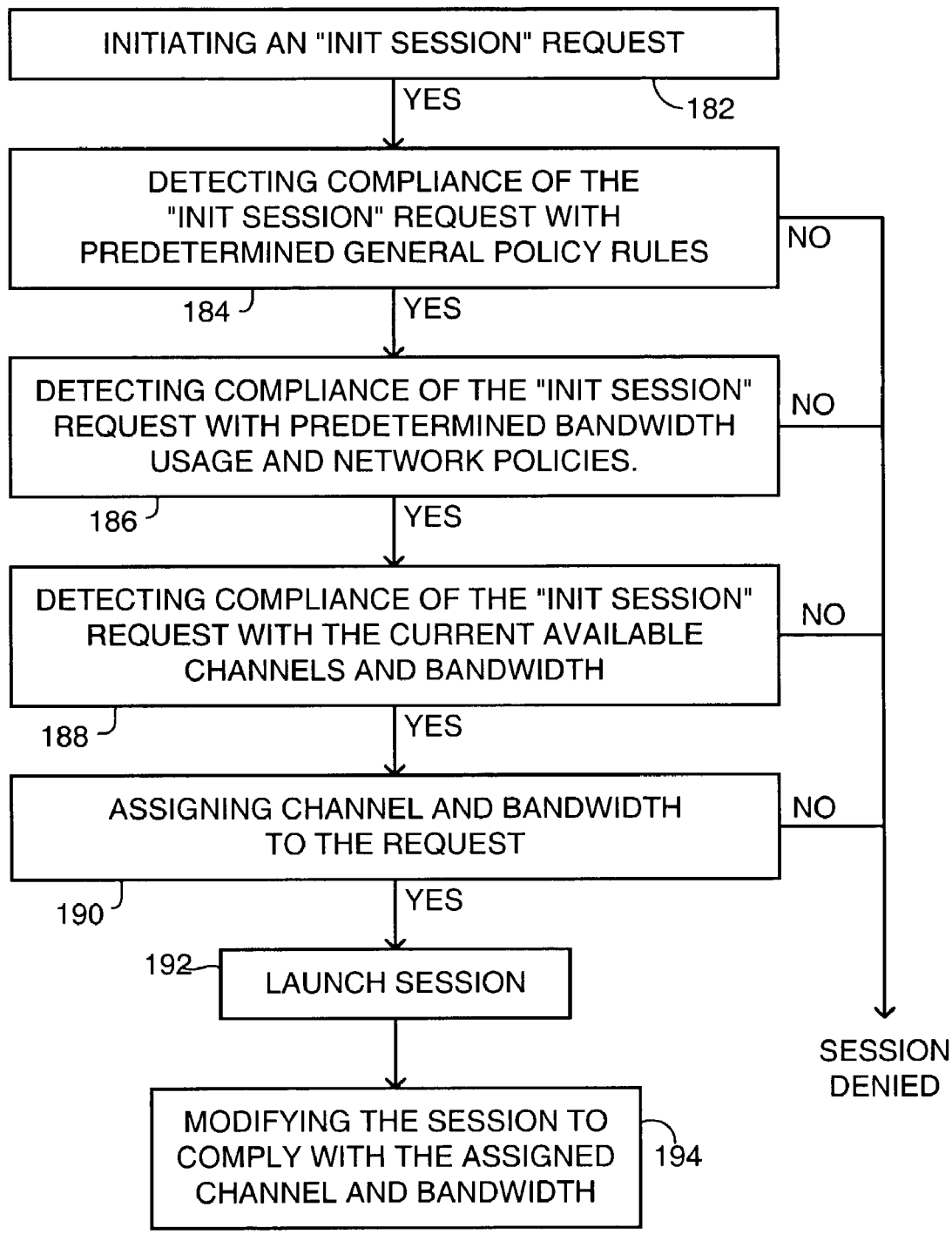
FIG. 4 is an illustration of a method for operating the session management architecture of FIG. 3 of the systems of FIGS. 2A-2B, operative in accordance with further preferred embodiments of the present invention.

Reference is now made to FIG. 4, which is an illustration of method 181 for operating session management architecture 150 of BMS 36, operative in accordance with another preferred embodiments of the present invention. Method 181 includes steps 182, 184, 186, 188, 187, 190, 192 and 194.

Method 181 starts at step 182, in which a session initialization request is detected. With reference to FIG. 3, session manager 102 receives an init-session request, as described herein above.

Step 182 is followed by step 184 in which compliance of the session initialization request with predetermined general policy rules, is detected. With reference to FIG. 3, session manager 102 checks compliance of the requested session with policy records of database 141. If such compliance is not detected, then the session is denied.

In step 186, compliance of the session initialization request with predetermined bandwidth usage and network policies, is detected. With reference to FIG. 3, session manager 102 determines if the requested session can be approved according to a plurality of parameters such as network policies in the network database 149, target policies in target database 143, general policies in the policy database 141, application manager policies in the external application database 147, additional information resources 148, and the like. If such compliance is not detected, then the session is denied.

In step 188, compliance of the session initialization request with the current available channels and bandwidth, is detected. With reference to FIG. 3, shared area manager 144$_r$ checks compliance of the session with channels and bandwidth, which are currently available in the potential path of the session. Said path includes the communication link coupling the members of service group 35$_r$ to BMS 36.

If a compliance of the session initialization request with the current available channels and bandwidth is not detected, then the session is denied. It is noted that step 188 can further include dynamic reallocating of network resources so as to make channels and bandwidth available to the requested session.

In step 190, channel and bandwidth are assigned to the requested session. With reference to FIG. 3, shared area manager 144$_r$ assigns channel and bandwidth to the requested session, which is then launched during step 192. Launching a session according to claim 192 includes programming the selected input module, the switch 274 and the selected output module. It is noted that the bandwidth utilization collector 104 can also be updated accordingly.

In further detail, the DNR manager 106 performs channel and frequency switching (in hardware), and dynamically changes the amount of channels that are dedicated to each group of nodes, according to the bandwidth usage across groups of nodes. This allocation can be dynamic as long as the total number of dedicated channels does not exceed the maximum frequency band that is physically achievable within any service group.

Figure 5:
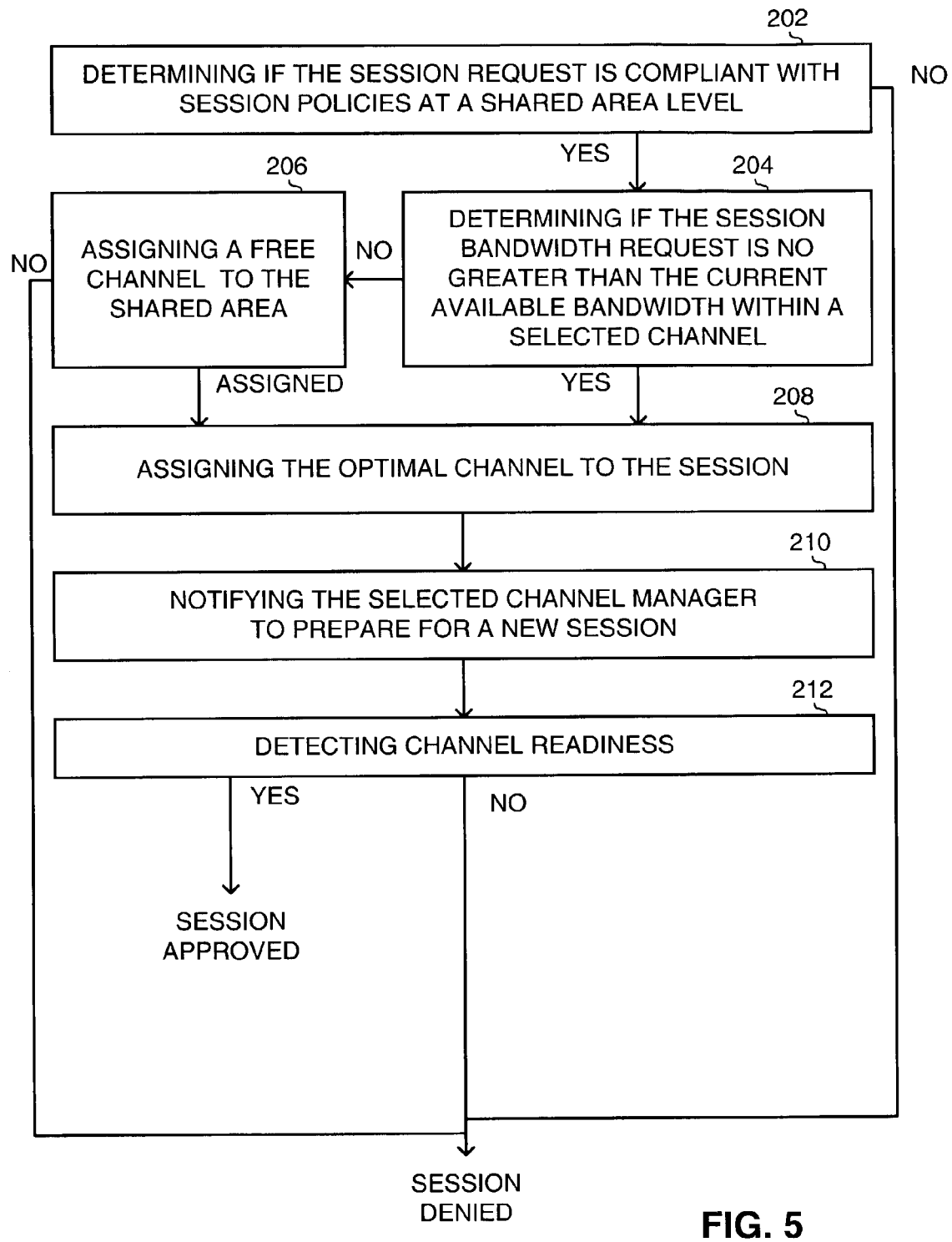
FIG. 5 is an illustration of a method for operating the area managers of FIG. 3 operative in accordance with a further preferred embodiment of the present invention.

Reference is now made to FIG. 5, which is an illustration of method 241 for operating shared area manager 144$_r$ of FIG. 3, operative in accordance with a further preferred embodiment of the present invention. It is noted that shared area manager 144$_r$ is preferably a logical module, which is used to manage a physical shared area, to which a plurality of nodes are connected.

In step 202, compliance of the initialization session request against session policies at a shared area level, is determined. If such compliance is not determined, then the session is denied.

In step 204, the session bandwidth request, respective of the initialization session request, is compared with the current available bandwidth within a selected channel. It is noted that a conventional session can run over one or more channels, where each channel has to be able to provide a predetermined bandwidth. Accordingly, If the session bandwidth request is greater than the current available bandwidth with respect to selected channels, then session request proceed to step 206, else session request proceed to step 208.

In step 206, a free channel is assigned to the current shared area where one is available. This assignment is performed by the DNR 106, as will be described herein below. If such assignment fails, then the session request is denied.

In step 208, an optimal channel is assigned to the session, based on session content type & load balancing network policy. Optimization schemes for managing the load can be determined according to various considerations and can be set by the system operator.

In step 210, the selected channel manager is notified to prepare for a new session. The channel manager adds, by means of multiplexing, this new session to the sessions, which are currently present in that channel. It is noted that this notification can further include session parameters, which are directed at reducing the bandwidth of that session or other selected sessions in the channel.

In step 212, the channel readiness is determined. If the channel is not ready, then the session request is denied. Otherwise, the session request is approved.

Figure 6:
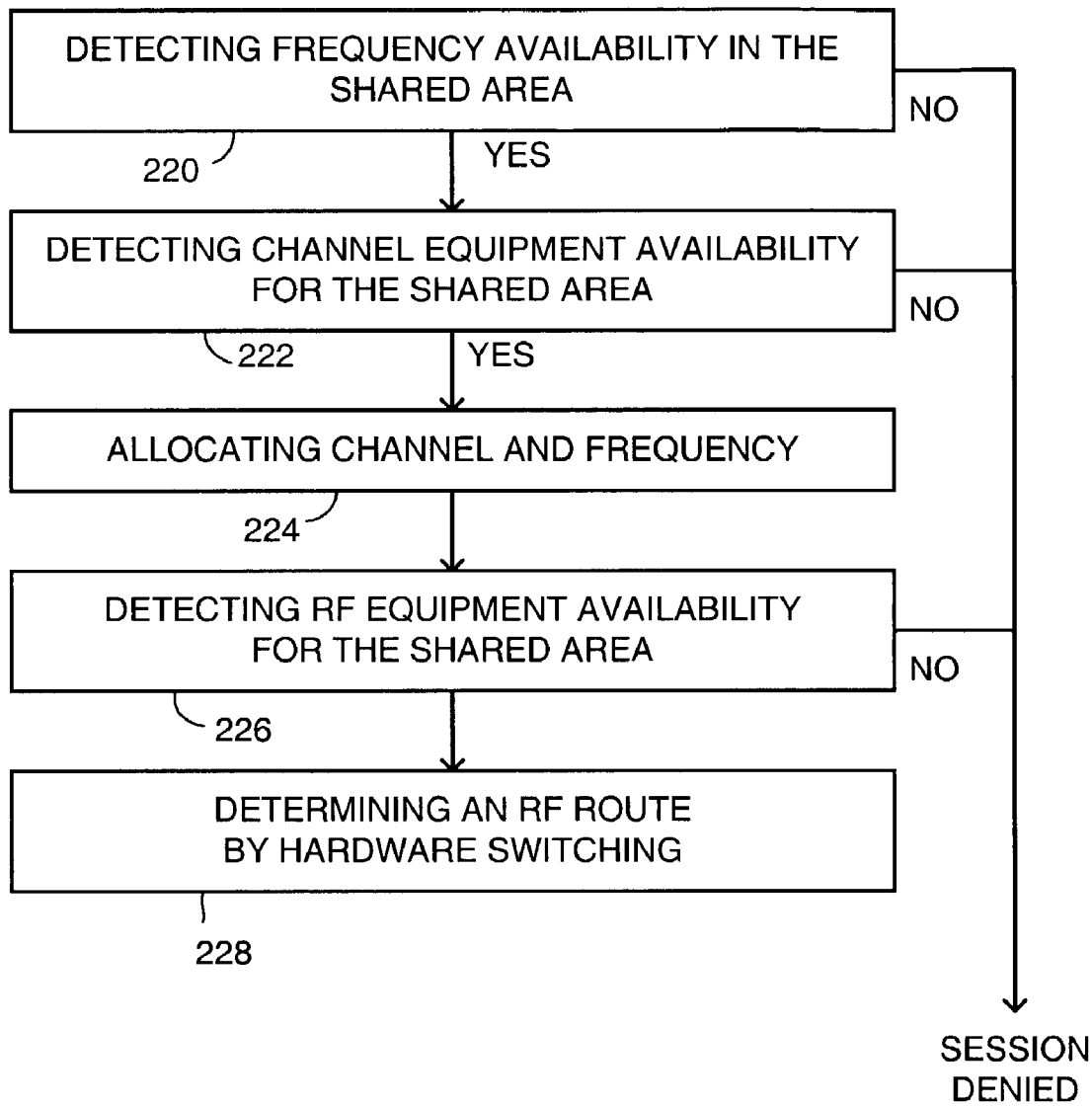
FIG. 6 is an illustration of a method for operating a dynamic network resources manager, operative in accordance with a further preferred embodiment of the present invention.

Reference is now made to FIG. 6, which is an illustration of method 221 for operating DNR manager 106, operative in accordance with another preferred embodiment of the present invention. In step 220, bandwidth availability in the shared area, is detected. The bandwidth availability is detected with respect to the frequency bandwidth which is regularly available, and with respect to the currently running application, applications which are scheduled to run during the anticipated time frame of the session request, and other considerations such as bandwidth, which has to be reserved, and the like. If frequency bandwidth is not available, according to the session request, then the session request is denied.

In step 222, availability of channel equipment at the shared area (hardware) is detected. Such channel equipment can include for example an available QAM unit. If such channel equipment is not available, then the session request is denied.

In step 224, channel and frequency are allocated. With reference to FIG. 3, dynamic network restructuring unit 106 operates a selected QAM unit, to modulate the soon to be running session, at a selected frequency bandwidth.

In step 226, RF equipment availability is located for the shared area. Such RF equipment is for example an available input port at a functioning RF combiner. If such RF equipment, which meets the requirements of the session request, is not available, then the session request is denied.

In step 228, an RF route is determined by hardware switching. With reference to FIG. 3, dynamic network restructuring unit 106 operates RF switch 120 to connect a selected QAM of QAM array 118, to a selected input port at a selected RF combiner of RF combiner array 122.

Figure 7:
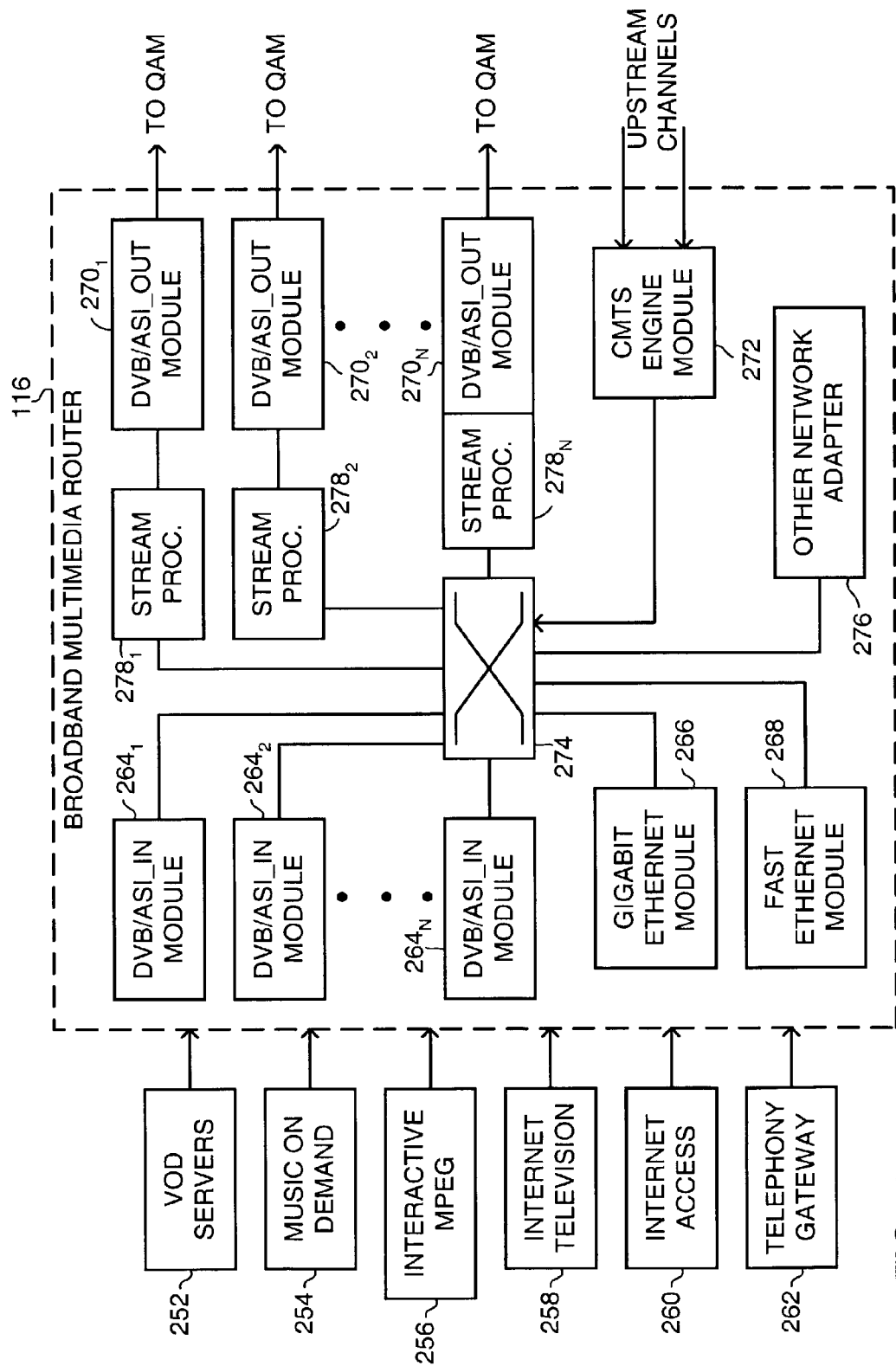
FIG. 7 is a detailed schematic illustration of the router of FIGS. 2A-2B, constructed and operative in accordance with another preferred embodiment of the present invention.

Reference is now made to FIG. 7, which is a detailed schematic illustration of broadband multimedia routers 116, constructed and operative in accordance with further preferred embodiments of the invention.

Broadband multimedia router 116 is operative to direct a variety of packet types, even when a packet does not include destination address information. According to the present invention, broadband multimedia router 116 makes sure that each entering data packet, which does not include destination information, is assigned such information, according to the session directing commands provided by the session manager 102.

Broadband multimedia router 116 is fed by VOD servers 252, music on demand unit 254, interactive MPEG unit 256, Internet television 258, telephony gateway 262, and the like. Broadband multimedia router 116 can also be fed by an external timing information generation unit that provided timing information to be later converted to timing packet information by broadband multimedia router 116. Broadband multimedia router 116 includes a plurality of DVB-ASI_IN modules $264_1$, $264_2$ and $264_N$, Gigabit Ethernet module 266, Fast Ethernet module 268, a plurality of DVB-ASI_OUT modules $270_1$, $270_2$ and $270_N$, a plurality of stream processors $278_1$, $278_2$ and $278_N$, and a core switch 274. It is noted that broadband multimedia router 116 further includes an internal controller and intermediate memory means (not shown), for operating and coordinating the various units thereof.

Switch 274 is connected to DVB-ASI_IN modules $264_1$, $264_2$ and $264_N$, Gigabit Ethernet module 266, Fast Ethernet module 268, additional network adapter 276 and CMTS Engine Module 272. Switch 274 is further connected to DVB-ASI_OUT modules $270_1$, $270_2$ and $270_N$, via respective stream processors $278_1$, $278_2$ and $278_N$. DVB-ASI_OUT modules $270_1$, $270_2$ and $270_N$ are further coupled to network interface unit 117, for providing downstream data to end-users via network 30 and BMS.

DVB-ASI_IN modules $264_1$, $264_2$ and $264_N$ are input ports, which receive MPEG transport packets. It is noted that an MPEG transport packet encapsulating elementary media, includes a stream ID, also called PID. Stream processors $278_1$, $278_2$ and $278_N$ are operative to perform stream processing procedures such as multiplexing, re-multiplexing, rate adaptation, PID re-mapping, PCR re-stamping, updating system information embedded in transport streams, and the like. it is noted that stream processors 278 can be considered an integral part of broadband multimedia router 116. It is further noted that some MPEG transport packets are timing information packets.

The following is an example for a complex routing situation, which is performed by broadband multimedia router 116. DVB-ASI_IN module $264_1$ receives three media streams $S_1$, $S_2$ and $S_3$, having PIDs of 50, 100 and 200, respectively. Media streams $S_1$, $S_2$ and $S_3$ are to be directed to DVB-ASI_OUT modules $270_2$, $270_2$ and $270_1$, respectively. Substantially, at the same time, DVB-ASI_IN module $264_2$ receives four media streams $S_4$, $S_5$, $S_6$, and $S_7$, having PIDs of 100, 120, 200 and 300, respectively. Media streams $S_4$, $S_5$, $S_6$, and $S_7$ are to be directed to DVB-ASI_OUT modules $270_2$, $270_7$ (not shown), $270_1$ and $270_{23}$ (not shown), respectively.

In the present example, core switch 274 is a generic packet switching device and hence every packet provided thereto, has to be in a known addressable packet format. With respect to the media streams received at DVB-ASI_IN module $264_1$, broadband multimedia router 116 encapsulates a packet of media stream $S_1$, in an addressable packet, with destination information respective of the switch port, connected to DVB-ASI_OUT module $270_2$ and its original stream PID 50.

Switch 274 directs the produced addressable packet to DVB-ASI_OUT module $270_2$, which opens the encapsulation, reconstructs the media stream packet, and assigns the stream PID provided by broadband multimedia router 116. It is noted that broadband multimedia router 116 can provide a stream PID, which is different from the original stream PID of the packet, as will be described herein below.

Broadband multimedia router 116 encapsulates a packet of media stream $S_2$, in an addressable packet, with destination information respective of the switch port connected to DVB-ASI_OUT module $270_2$ and its original PID 100. Broadband multimedia router 116 encapsulates a packet of media stream $S_3$, in an addressable packet, with destination information respective of the switch port connected to DVB-ASI_OUT module $270_1$ and its original PID 200.

With respect to the media streams received at DVB-ASI_IN module $264_2$, broadband multimedia router 116 encapsulates a packet of media stream $S_4$, in an addressable packet, with destination information respective of the switch port connected to DVB-ASI_OUT module $270_2$ but assigns a new PID 150, since PID 100 is already used for DVB-ASI_OUT module $270_2$, by media stream $S_2$. Here, switch 274 directs the produced addressable packet to DVB-ASI_OUT module $270_2$, which opens the encapsulation, reconstructs the media stream packet, and assigns the stream PID (150) provided by broadband multimedia router 116, which is different than the original stream PID (100). Similarly, broadband multimedia router 116 encapsulates a packet of media stream $S_6$, in an addressable packet, with destination information respective of the switch port connected to DVB-ASI_OUT module $270_1$ but with a new PID 100, since PID 200 is already used for DVB-ASI_OUT module $270_1$ by media stream $S_3$. This procedure is called PID re-mapping.

Broadband multimedia router 116 encapsulates a packet of media streams $S_5$ and $S_7$, in addressable packets, with destination information respective of the switch port connected to DVB-ASI_OUT modules $270_7$ and $270_{23}$, with their respective original PIDs 120 and 300.

The above routing procedure is performed according to specific instruction provided by the session manager 102, for example, by means of a routing table. In case of an MPEG transport packet, broadband multimedia router 116 accesses the routing table according to the stream PID of that packet, and the DVB-ASI_IN module identification, which was received, and retrieves the predetermined destination associated therewith. It is noted that the predetermined destination is respective of the combination of the packet stream PID, and the respective DVB-ASI_IN module identification.

A data packet received from Gigabit Ethernet module 266, or from Fast Ethernet module 268, is typically an addressable packet and hence already contains destination information. This data packet can be directed to a respective output port of the switch, according to that destination information. It is noted that session manager 102 can instruct broadband multimedia router 116, for example, by means of a routing table, to direct addressable packets to predetermined ports, which are set to be different but according to the destination information embedded in the packet.

Broadband multimedia router 116 is further operative to perform various stream processing procedures such as multiplexing, re-multiplexing, rate adaptation, PID re-mapping, PCR re-stamping (e.g., jitter reduction procedure by updating the program clock reference fields), updating system information embedded in transport streams, and the like. Such stream processing procedures are usually carried in an outgoing route of broadband multimedia router 116 (e.g., either in switch 274, in one of the output modules 270, 266 and 268, or in the route there between, by specific modules). In the present example, each of the DVB-ASI_OUT modules 270 is also operative to encapsulate other types of data in MPEG transport format, perform statistical multiplexing, and stream rate adaptation, to adapt the bandwidth and quality of the media stream to the available network resources.

CMTS Engine Module 272 receives data over MPEG transport from the end-user in the upstream direction, transforms it to IP format and provides it to the switch 274, for directing to an IP module such as Gigabit Ethernet module 266, or Fast Ethernet module 268. CMTS Engine Module 272 further transmits DOCSIS downstream information to the end-user via DVB-ASI_OUT modules 270.

Additional network adapter 276 is operative to connect to various network types such as ATM, SONET, and the like.

Figure 8:
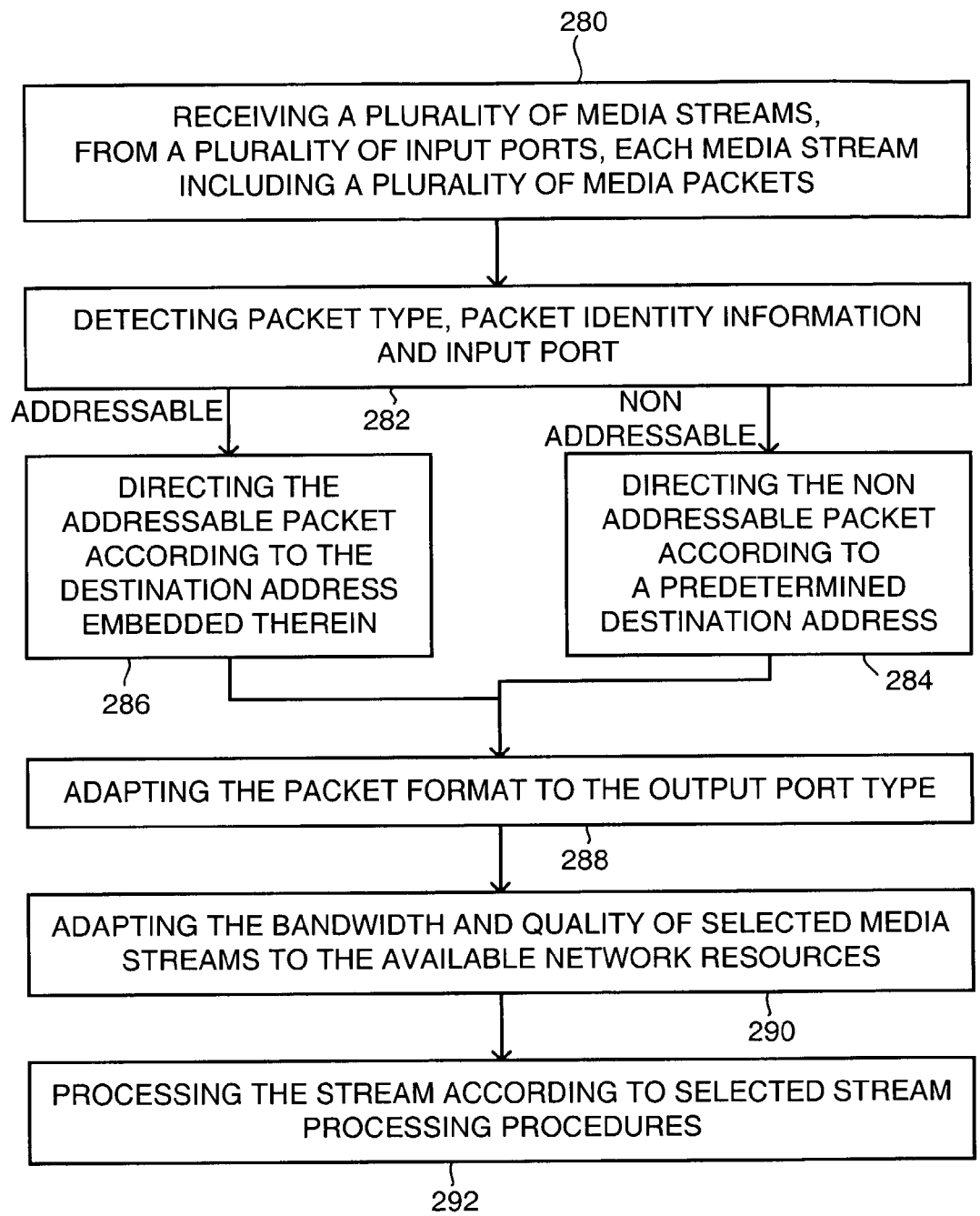
FIG. 8 is an illustration of a method for operating the routers of FIG. 7, operative in accordance with a further preferred embodiment of the present invention.

Reference is now made to FIG. 8, which is an illustration of method 281 for operating broadband multimedia router 116, operative in accordance with another preferred embodiment of the present invention. In step 280 a plurality of media streams are received from a plurality of input ports, where each media stream includes a plurality of media packets. These media streams can include video streams, audio streams, data streams and the like. With reference to FIG. 7, DVB-ASI_IN modules $264_1$, $264_2$ and $264_N$, Gigabit Ethernet Module 266, and Fast Ethernet module 268 receive a plurality of media streams from VOD Servers 252, music on demand 254, interactive MPEG 256, Internet television 258, Internet access 260, telephony gateway 262, and the like.

In step 282 the type of a selected packet, its identity and the input port in which it was received, are detected. These media streams are generally divided in two types, which are addressable media streams and non-addressable media streams. An addressable media stream includes specific destination information, which is typically embedded in each of its packets, such as in IP packet, Ethernet packet, and the like. Such destination information is used to direct each packet to the final destination, and do so at different routes for each packet. A non-addressable media stream does not include specific destination information, such as MPEG transport elementary stream, which only includes a packet identification code, indicating that the stream packets belong to the same stream. With reference to FIG. 7, broadband multimedia router 116 determines the packet type, according to the type of input port it was received in. A packet received in a DVB-ASI_IN module 264 is a non-addressable multimedia stream oriented packet (e.g. video, audio or data over multi-media transport standards such as IP over MPEG transport). A packet received in Gigabit Ethernet module 266 or from Fast Ethernet module 268 is an addressable media stream oriented packet, such as an IP packet. The identity and input port information is stored and used in the routing process of each packet. If the packet is non-addressable media stream oriented, then the method proceeds to step 284. Otherwise, if the packet is addressable media stream oriented, then the method proceeds to step 286.

In step 284, a non-addressable packet is directed according to a predetermined destination address. Hence, a non-addressable media stream packet is temporarily converted into an addressable media stream packet, which hence, can be directed. The destination address is provided by the session manager 102, and is retrieved momentarily according to the packet stream identification, and according to the identification of the input port, which received it. It is noted that a packet can have more than one destination address. This is known as multicast.

In step 286, an addressable packet is directed according to a destination address embedded therein. It is noted that this address can further be translated to another predetermined destination address provided by the session manager 102.

In step 288, the packet format is adapted to conform to the type of the output port. If the routing was performed on data oriented packets, such as IP packets, and the output port type is DVB-ASI, then the packet is converted as follows: a stream oriented packet which was encapsulated in an IP packet format, is reconstructed. A data oriented packet is converted to (encapsulated in) MPEG transport format packets.

In steps 290 and 292, the bandwidth and quality of selected media streams are adapted to meet the available network resources and the stream is processed according to selected stream processing procedures, such as multiplexing, re-multiplexing, rate adaptation, PID re-mapping, PCR re-stamping, updating system information embedded in transport streams, and the like. With reference to FIG. 7, these operations are performed by DVB-ASI_OUT modules 270 and stream processors 278.

This technique of enabling non addressable media stream switching (such as MPEG) provides several advantages such the enhanced sharing of bandwidth among several sessions, the mere mixing of addressable media streams with non addressable media streams, enhanced hardware and bandwidth utilization and more.

Figure 10:
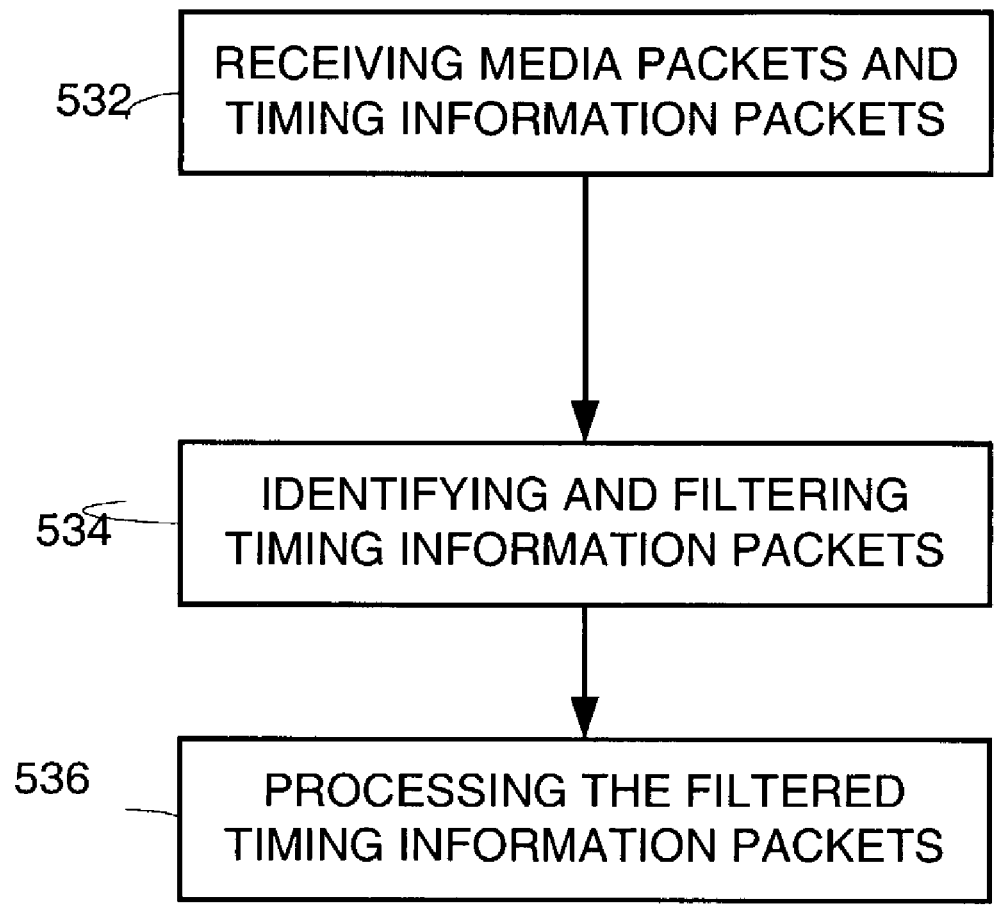
FIG. 10 is a flow chart illustrating a method for processing timing information packets, in accordance with a preferred embodiment of the invention.

Reference in now made to FIG. 10, illustrating method 530 for processing timing information packets, in accordance to a preferred embodiment of the invention.

Method 530 starts by step 532 of receiving a plurality of media packets and timing information packets. Referring to the example set forth in FIGS. 1A-1B, DHCT 132 receives media packets and timing information packets via tuner 152.

Step 532 is followed by step 534 of identifying and filtering timing information packets. Referring to the example set forth in FIG. 1A, the received media packets and timing information packets are provided to MPEG parser 153 that identifies the timing information packets according to their PID. Timing information packets have a unique PID that causes MPEG parser 153 to provide them to processor 150 to be processed by MACE 151. MACE 151 can filter out timing information packets that are not destined to DHCT 132 in response to an address (ADD) embedded within the timing information packets.

Step 534 is followed by step 536 of processing the filtered timing information packets. The timing information can be utilized for MAC schemes, such as but not limited to slotted ALOHA. It is noted that the timing information can include a common clock for allowing distinct DHCTs sharing the same upstream out of band channel to align their transmissions. It if further noted that the execution of MAC protocols such as slotted ALOHA requires the exchange of system messages, such as DVS 167 messages.

Figure 11:
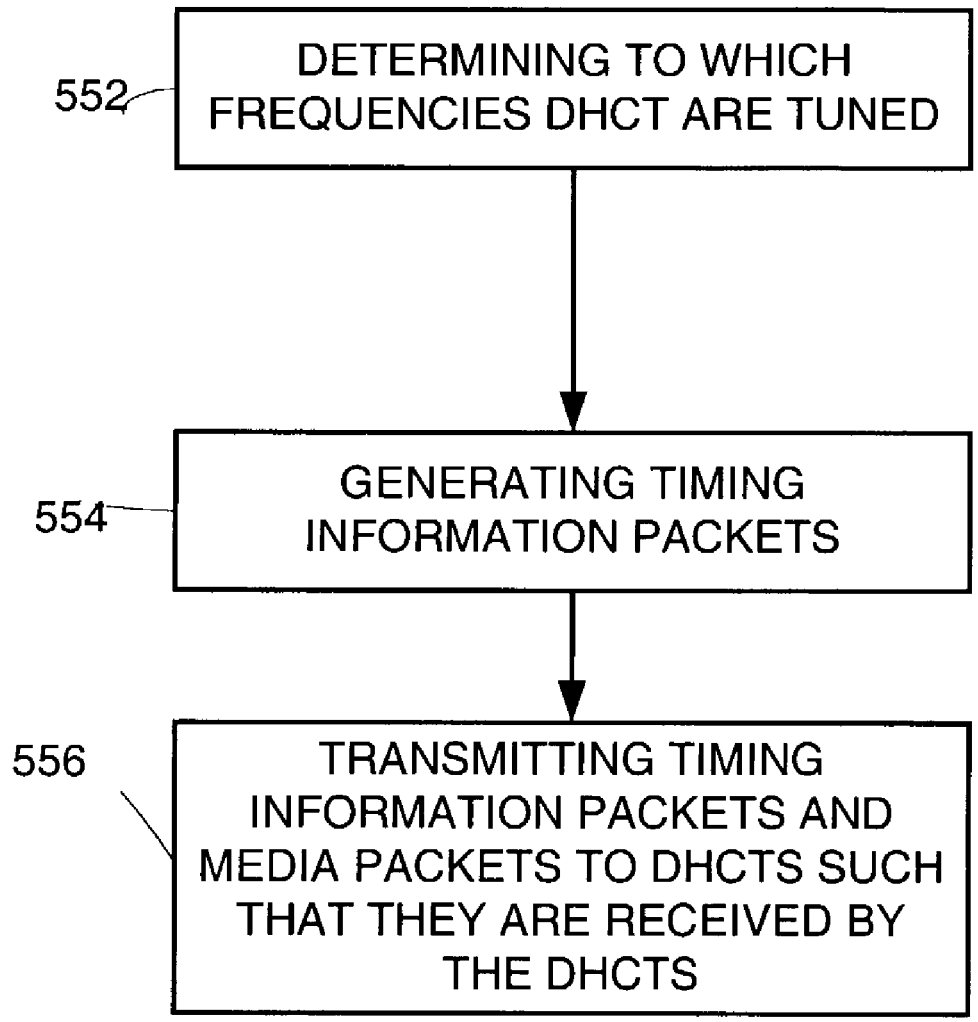
FIG. 11 is a flow chart illustrating a method for providing timing information packets, in accordance with a preferred embodiment of the invention.

Reference is now made to FIG. 11 illustrating method 550 for generating and providing timing information packets to DHCTs, in accordance to a preferred embodiment of the invention.

Method 550 includes step 552 of determining to which channels/frequencies the DHCTs are tuned. The determination can be made on a DHCT basis or on a DHCT group basis.

Step 552 is followed by step 554 of generating timing information packets to be provided to the DHCTs.

Step 554 is followed by step 558 of transmitting timing information packets and media packets to the DHCTs such that the timing information packets are received by the DHCTs. The frequency of the carrier waves that convey the timing information packets are selected in response to the determination of step 552.

It is noted that the method and apparatus according to the present invention can be implemented either in hardware, in software or in a combination thereof.

It will be apparent to those skilled in the art that the disclosed subject matter may be modified in numerous ways and may assume many embodiments other then the preferred form specifically set out and described above.

Accordingly, the above disclosed subject matter is to be considered illustrative and not restrictive, and to the maximum extent allowed by law, it is intended by the appended claims to cover all such modifications and other embodiments, which fall within the true spirit and scope of the present invention.

The scope of the invention is to be determined by the broadest permissible interpretation of the following claims and their equivalents rather then the foregoing detailed description.

The invention claimed is:

1. A system for providing timing information to a plurality of digital home communication terminals being tuned to at least one frequency, the system comprising: a timing information packet generator, for generating timing information packets and providing timing information packets to a transmitter; and a transmitter, coupled to the timing packet generator, for transmitting timing information packets to the plurality of digital home communication terminals, in response to the at least one frequency, wherein at least one digital home communication terminal is a timing information limited digital home communication terminals, and wherein at least one timing information limited digital home communication terminal is not able to receive or process timing information in at least one predefined manner.

2. A system for providing timing information to a plurality of digital home communication terminals being tuned to at least one frequency, the system comprising: a timing information packet generator, for generating timing information packets and providing timing information packets to a transmitter; and a transmitter, coupled to the timing packet generator, for transmitting timing information packets to the plurality of digital home communication terminals, in response to the at least one frequency, wherein at least one digital home communication terminal is a timing information limited digital home communication terminals, and wherein at least one timing information limited digital home communication terminal is configured to process timing information being transmitted at a high communication layer.

3. A system for controlling an access of a group of digital home communication terminals to a shared channel, the group of digital home media communication terminals being tuned to at least one frequency, the system comprising: a centralized media access controller for generating media access control information; and a transmitter, coupled to the centralized media access controller, for transmitting timing information packets embedding media access control information to the croup of digital home communication terminals in response to the at least one frequency, wherein at least one digital home communication terminals is a timing information limited digital home communication terminals, and wherein at least one timing information limited digital home communication terminal is not able to process media access control information in at least one predefined manner.

4. A system for controlling an access of a croup of digital home communication terminals to a shared channel, the group of digital home media communication terminals being tuned to at least one frequency, the system comprising: a centralized media access controller for generating media access control information; and a transmitter, coupled to the centralized media access controller, for transmitting timing information packets embedding media access control information to the group of digital home communication terminals in response to the at least one frequency, wherein at least one digital home communication terminals is a timing information limited digital home communication terminals, and wherein at least one timing information limited digital home communication terminal is configured to process media access control information being transmitted at a high communication layer.

5. A system for controlling an access of a croup of digital home communication terminals to a shared channel, the group of digital home media communication terminals being tuned to at least one frequency, the system comprising: a centralized media access controller for generating media access control information; a transmitter, coupled to the centralized media access controller, for transmitting timing information packets embedding media access control information to the croup of digital home communication terminals in response to the at least one frequency; a router, coupled between the centralized media access controller and the transmitter, the router operative to receive timing information packets and media packets, and to provide timing information packets and media packets to the group of digital home communication terminal; and a session manager, coupled to the router, the session manager providing routing instructions to said router, for dynamically selecting timing information packets and media packets out of the received timing information packets and media packets.

6. The system according to claim 5 wherein the dynamic selection is responsive to the identity of digital home communication terminals.

7. The system according to claim 5 wherein each digital home communication terminal is configured to filter timing information packets that are directed to the digital home communication terminal.

8. The system according to claim 5 wherein each digital home communication terminal is configured to filter timing information packet that are directed to at least one member of the group of digital home communication terminals.

9. The system according to claim 5 further comprising at least one media degradation unit, for compressing media packets.

10. The system according to claim 5 wherein at least some of the media signals and timing information packets are MPEG compliant.

11. The system according to claim 5, wherein the transmitter comprising a plurality of network transmitters.

12. The system according to claim 11 further comprising a network dynamic network restructuring unit, coupled to the network transmitters, for providing channel managing commands to each said network transmitters, receiving group-associated timing information packets from said router.

13. The system according to claim 5, wherein said session manager receives a plurality of session requests, for executing a session through the system, the session manager either allows or denies each said session requests, said session manager provides resource allocation parameters for each said allowed sessions.

14. The system according to claim 5 wherein at least one digital home communication terminals is timing information limited digital home communication terminals.

15. The system according to claim 14 wherein at least one timing information limited digital home communication terminal is not able to process liming information in at least one predefined manner.

16. The system according to claim 14 wherein at least one timing information limited digital home communication terminal is configured to process timing information being transmitted at a high communication layer.

17. The system according to claim 14 wherein at least one timing information limited digital home communication terminal is DVS 178 compliant.

18. The system according to claim 5 wherein the system further comprises a receiver for receiving information transmitted from digital home communication terminals.

19. The system according to claim 18 wherein digital home communication terminals are configured to transmit information to the system in response to a reception of timing information packets.

20. The system according to claim 5 wherein timing information packets include system messages.

21. The system according to claim 5 wherein the plurality of digital home communication terminals are grouped, such that each group shares a single upstream channel.

22. The system according to claim 21 wherein the timing information packets include timing information for allowing media access control of the upstream channels.

23. The system according to claim 5 wherein the system is configured to receive tuner status information reflecting the at least one frequency.

24. A system for providing media packets and timing information packets to a plurality of digital home communication terminals being tuned to at least one frequency, wherein some of the timing information packets and some of the media packets are non-addressable packets, wherein some media packets are addressable packets, wherein the system comprising: a router, operative to receive timing information packets and media packets, and to provide timing information packets and media packets to the plurality of digital home communication terminals; and a session manager, coupled to the router, the session manager providing routing instructions to said router, for dynamically selecting timing information packets and media packets out of the received timing information packets and media packets.

25. The system according to claim 24 further comprising a transmitter for transmitting timing information packets embedding media access control information to the plurality of digital home communication terminals in response to the at least one frequency.

26. The system according to claim 24 wherein the router comprising: a plurality of input ports, including at least one non-addressable stream input port; a plurality of non-addressable stream output ports; a multiple port switch, connected between said non-addressable stream input ports and said non-addressable stream output ports; said multiple port switch directing a non-addressable timing information packets and media packets, received from a selected one of said at least one non-addressable stream input ports, to at least a selected one of said at least one non-addressable stream output ports, said multiple port switch selecting said selected non-addressable stream output port according to the type and identity of said selected non-addressable stream input port and the identity information embedded in said non-addressable timing information packet.

27. The system according to claim 26, further comprising at least one addressable stream communication port, connected to said multiple port switch, said multiple port switch directing an addressable media packet, received from a selected one of said at least one addressable stream communication ports, to at least a selected one of said at least one non-addressable stream output ports.

28. The system according to claim 26, wherein the selected non-addressable stream output port encapsulates an addressable media packet in a non-addressable stream packet, when the addressable packet is received from One of said at least one addressable stream input ports.

29. The system according to claim 26, wherein MPEG transport packets are encapsulated into communication packets respective of the communication protocol of said multiple port switch.

30. The system according to claim 26, where in said at least one non-addressable stream input port comprises a multiple program transport interface and wherein said at least one non-addressable stream output port comprises a multiple program transport interface.

31. The system according to claim 26, further comprising a plurality of stream processors, each said stream processor being connected between said multiple port switch and a respective one of said non-addressable stream output ports.

32. The system according to claim 26 wherein timing information packets comprise an identification 110 field.

33. A digital home communication terminal operative to share an upstream channel with other digital home communication terminals, the digital home communication terminal comprising: a tuner, coupled to communication channel, for receiving timing information packets and media packet; a filter, coupled to the tuner, for filtering received timing information packets and media packets, and providing the timing information packets to a processor; a processor, coupled to a display unit configured to process the timing information packets and accordingly to control an access of the digital home communication terminal to the upstream channel.

34. The digital home communication terminal according to claim 33 wherein the filter comprises an MPEG parser.

35. The digital home communication terminal according to claim 33 wherein the timing information packets are self-contained.

36. The digital home communication terminal according to claim 33 further adapted to transmit, via the upstream channel, a status of the tuner to a system for providing timing information packets.

37. A method for generating and providing timing information packets to digital home communication terminals, the digital home communication terminals tuned to at least one frequency, the method comprising the steps of: tracking the at least one frequencies; generating timing information packets; and transmitting timing information packets to the digital home communication terminals in response to the at least one frequency; wherein at least one digital home communication terminal is a timing information limited digital home communication terminals, and wherein at least one timing information limited digital home communication terminal is not able to receive or process timing information in at least one predefined manner.

38. The method according to claim 37 where in at least one timing information limited digital home communication terminal is configured to process timing information being transmitted at a high communication layer.

39. A method for controlling an access of a group of digital home communication terminals to a shared channel, the group of digital home media communication terminals being tuned to at least one frequency, the method comprising the steps of: generating media access control information; and transmitting timing information packets embedding media access control information to the group of digital home communication terminals in response to the at least one frequency, wherein at least one digital home communication terminals is a timing information limited digital home communication terminals, and wherein at least one timing information limited digital home communication terminal is not able to process media access control information in at least one predefined manner.

40. A method for controlling an access of a group of digital home communication terminals to a shared channel, the group of digital home media communication terminals being tuned to at least one frequency, the method comprising the steps of: generating media access control information; and transmitting timing information packets embedding media access control information to the group of digital home communication terminals in response to the at least one frequency, wherein at least one digital home communication terminals is a timing information limited digital home communication terminals, and wherein at least one timing information limited digital home communication terminal is configured to process media access control information being transmitted at a high communication layer.

41. A method for providing timing information to a plurality of digital home media communication terminals being tuned to at least one frequency, the method comprising the steps of: receiving timing information packets and media packets; dynamically selecting timing information packets and media packets out of the received timing information packets and media packets; and providing the dynamically selected timing information packets and media packets to the at least one group of digital home communication terminal, wherein at least one digital home communication terminals is a timing information limited digital home communication terminals, and wherein at least one timing information limited digital home communication terminal is not able to process media access control information in at least one predefined manner.

42. A method for providing timing information to a plurality of digital home media communication terminals being tuned to at least one frequency, the method comprising the steps of: receiving timing information packets and media packets; dynamically selecting timing information packets and media packets out of the received timing information packets and media packets; and providing the dynamically selected timing information packets and media packets to the at least one group of digital home communication terminal, wherein at least one digital home communication terminals is a timing information limited digital home communication terminals, and wherein at least one timing information limited digital home communication terminal is configured to process media access control information being transmitted at a high communication layer.

43. A method for providing timing information to a plurality of digital home media communication terminals being tuned to at least one frequency, the method comprising the steps of: receiving timing information packets and media packets; dynamically selecting timing information packets and media packets out of the received timing information packets and media packets; and providing the dynamically selected timing information packets and media packets to the at least one croup of digital home communication terminal, wherein at least some of the media packets and the timing information packets are non-addressable packets; and wherein the method further comprising the steps of: receiving non-addressable packets from an input port selected from at least one non-addressable stream input port; dynamically selecting packets out of the received packets to be provided to at least one of a plurality of non-addressable stream output ports; whereas at least one non-addressable stream output port is coupled to at least one group of end-users; and directing said non-addressable packets to said selected non-addressable stream output port.

44. The method according to claim 43 wherein the selection is responsive to the type and identity of said selected input port and the identity information embedded in said received packet.

45. The method according to claim 43, wherein said input port is further selected from at least one addressable stream input port.

46. The method according to claim 43, further comprising the step of encapsulating said packet in a non-addressable stream packet, when said packet is received from one of said at least one addressable stream input ports.

47. The method according to claim 43, further comprising the step of encapsulating said packet in a addressable stream packet, when said packet is received from one of said at least one non-addressable stream input ports.

48. The method according to claim 43 wherein at least some of the media service conveying packets are MPEG compliant.

49. The method according to claim 43 wherein the step of selecting comprising selecting session requests, for executing a session in which application packets are to be provided to an associated group of end-users.

50. The method according to claim 49 wherein the step of selecting is preceded by a step of allocating system resources for providing the application packets.

* * * * *